(12) United States Patent
Nohara

(10) Patent No.: US 12,552,137 B2
(45) Date of Patent: Feb. 17, 2026

(54) LAMINATED GLASS AND VEHICLE

(71) Applicant: SEKISUI CHEMICAL CO., LTD., Osaka (JP)

(72) Inventor: Atsushi Nohara, Kouka (JP)

(73) Assignee: SEKISUI CHEMICAL CO., LTD., Osaka (JP)

(*) Notice: Subject to any disclaimer, the term of this patent is extended or adjusted under 35 U.S.C. 154(b) by 370 days.

(21) Appl. No.: 18/032,704

(22) PCT Filed: Oct. 20, 2021

(86) PCT No.: PCT/JP2021/038753
§ 371 (c)(1),
(2) Date: Apr. 19, 2023

(87) PCT Pub. No.: WO2022/085720
PCT Pub. Date: Apr. 28, 2022

(65) Prior Publication Data
US 2023/0391053 A1 Dec. 7, 2023

(30) Foreign Application Priority Data
Oct. 21, 2020 (JP) .................... 2020-176592

(51) Int. Cl.
*B32B 3/18* (2006.01)
*B32B 17/10* (2006.01)
(Continued)

(52) U.S. Cl.
CPC .. *B32B 17/10339* (2013.01); *B32B 17/10036* (2013.01); *B32B 17/10568* (2013.01);
(Continued)

(58) Field of Classification Search
CPC ........ B32B 17/10339; B32B 17/10036; B32B 17/10568; B32B 17/10605;
(Continued)

(56) References Cited

U.S. PATENT DOCUMENTS

2004/0160688 A1 8/2004 Noguchi et al.
2016/0096346 A1 4/2016 Nakamura et al.
(Continued)

FOREIGN PATENT DOCUMENTS

EP 2853387 4/2015
JP 2004-51466 2/2004
(Continued)

OTHER PUBLICATIONS

English language translation of International Preliminary Report on Patentability issued Apr. 13, 2023 in corrresponding International (PCT) Patent Application No. PCT/JP2021/038753.
(Continued)

*Primary Examiner* — Jamara A Franklin
(74) *Attorney, Agent, or Firm* — Wenderoth, Lind & Ponack, L.L.P.

(57) ABSTRACT

Provided is a laminated glass capable of transmitting light applied from a remote sensing device satisfactorily, and enhancing the heat shielding property. A laminated glass of the present invention includes a first lamination glass member, a second lamination glass member, and an interlayer film, the interlayer film is arranged between the first lamination glass member and the second lamination glass member, the first lamination glass member has a light transmittance of 85% or more at every wavelength within a range of 380 nm to 2500 nm, the laminated glass has a first region and a second region, and the second region has a light transmittance of higher than a light transmittance of the first region by 5% or more at at least one wavelength within a range of 380 nm to 2500 nm.

20 Claims, 9 Drawing Sheets

(51) Int. Cl.
  *G01S 7/481* (2006.01)
  *G01S 17/89* (2020.01)
  *B60J 1/00* (2006.01)
(52) U.S. Cl.
  CPC .... *B32B 17/10605* (2013.01); *B32B 17/1066* (2013.01); *B32B 17/10761* (2013.01); *G01S 7/4811* (2013.01); *G01S 17/89* (2013.01); *B32B 2264/102* (2013.01); *B60J 1/001* (2013.01)
(58) Field of Classification Search
  CPC .......... B32B 17/1066; B32B 17/10761; B32B 2264/102; B32B 3/18; B32B 2307/102; B32B 7/022; B32B 17/10082; B32B 17/1011; B32B 17/10119; B32B 27/22; B32B 27/30; B32B 2264/301; B32B 27/18; B32B 27/20; B32B 2250/44; B32B 2264/108; B32B 2307/4026; B32B 3/263; B32B 5/142; B32B 17/10633; B32B 17/10678; B32B 17/10688; B32B 17/10853; B32B 17/10935; B32B 2307/412; B32B 2307/416; B32B 2307/7376; B32B 2457/20; B32B 2605/08; B32B 7/12; B32B 27/08; B32B 17/10614; B32B 17/10651; G01S 7/4811; G01S 17/89; G01S 7/4813; G01S 17/931; B60J 1/001; B60K 2360/25; B60K 2360/785; B60K 2360/92; B60K 35/50; B60K 35/231; G02B 27/01; B60R 11/02; B60R 2300/301; C03C 4/0092; B60W 2420/408

See application file for complete search history.

(56) References Cited

U.S. PATENT DOCUMENTS

| | | | |
|---|---|---|---|
| 2016/0325529 | A1 | 11/2016 | Linthout et al. |
| 2019/0030862 | A1* | 1/2019 | Akiyama ................. H04R 7/06 |
| 2020/0230921 | A1 | 7/2020 | Yoshida et al. |
| 2021/0316532 | A1 | 10/2021 | Nakayama et al. |
| 2022/0355579 | A1 | 11/2022 | Nakayama et al. |

FOREIGN PATENT DOCUMENTS

| | | |
|---|---|---|
| JP | 2007-39278 | 2/2007 |
| JP | 2012-206877 | 10/2012 |
| JP | 2021-127286 | 9/2021 |
| TW | 201718429 | 6/2017 |
| TW | 201936540 | 9/2019 |
| WO | 2015/019921 | 2/2015 |
| WO | 2015/086683 | 6/2015 |
| WO | 2018/178278 | 10/2018 |
| WO | 2020/025360 | 2/2020 |
| WO | 2020/040305 | 2/2020 |

OTHER PUBLICATIONS

International Search Report (ISR) issued Dec. 28, 2021 in International (PCT) Application No. PCT/JP2021/038753.
Extended Search Report issued Sep. 9, 2024 in European Patent Application No. 21882861.4.

* cited by examiner

[FIG. 1.]
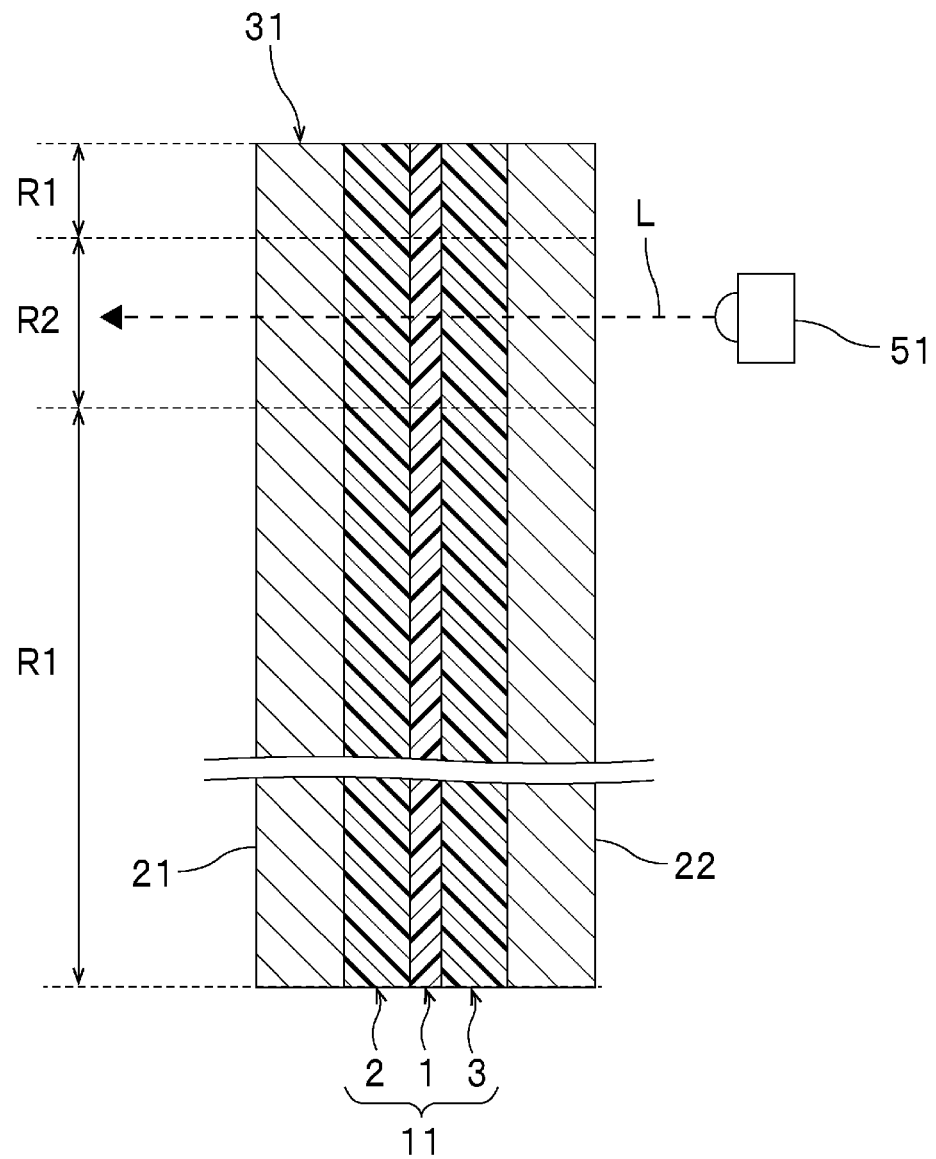

[FIG. 2.]
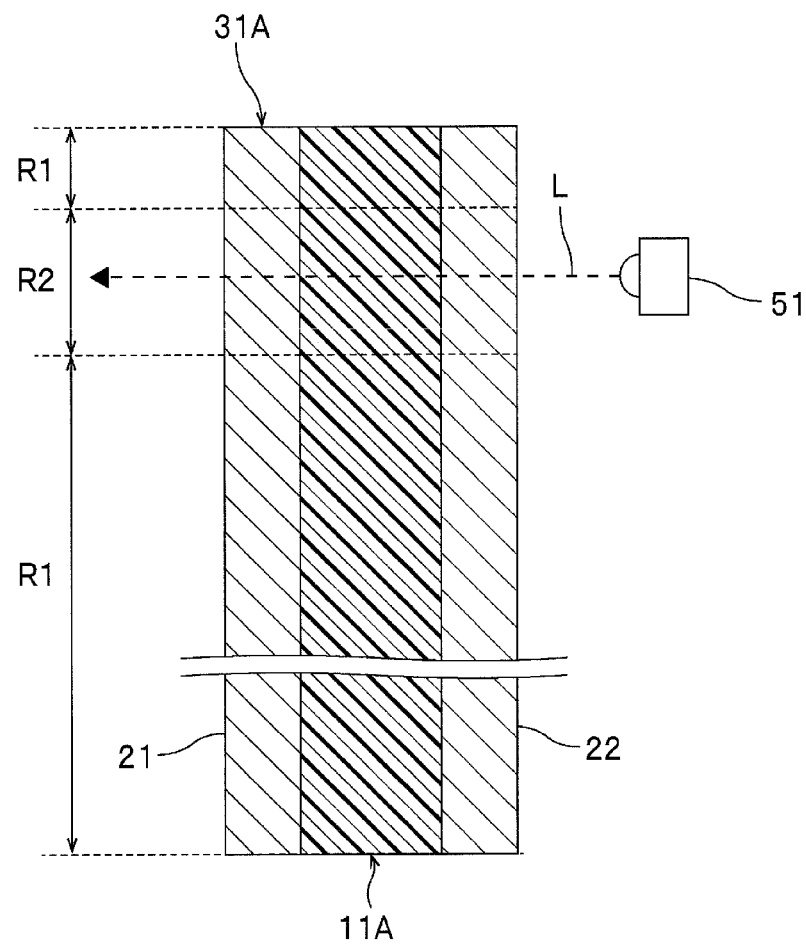

[FIG. 3.]
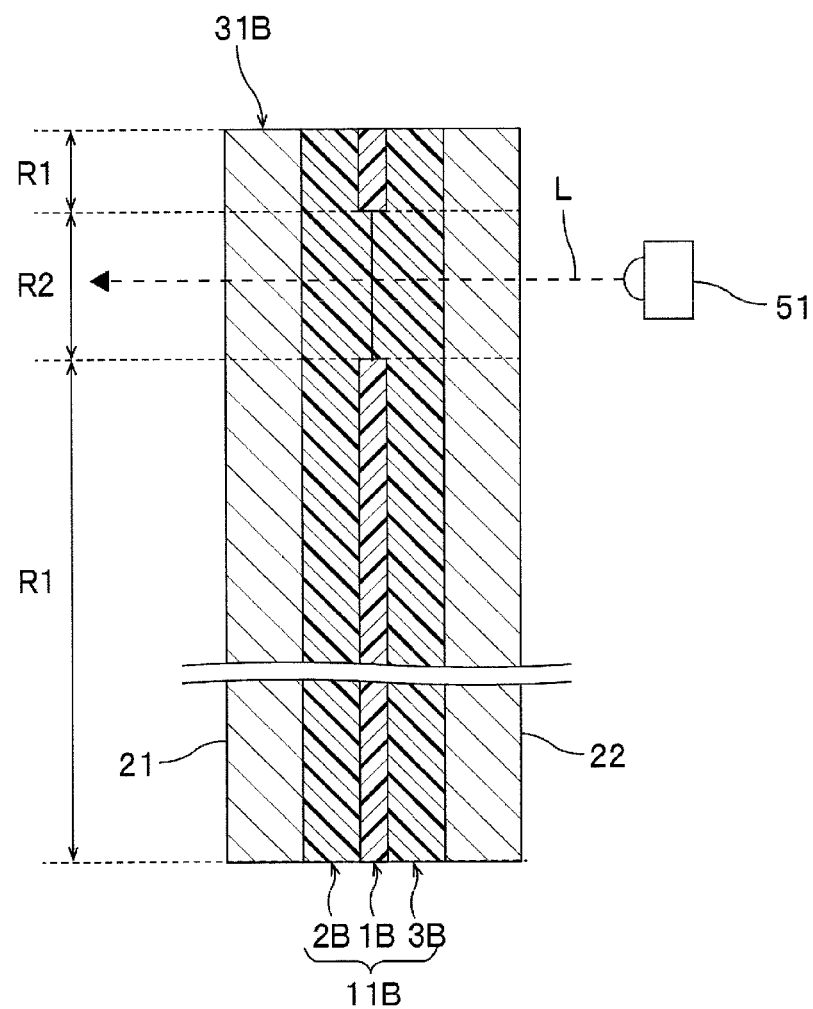

[FIG. 4.]
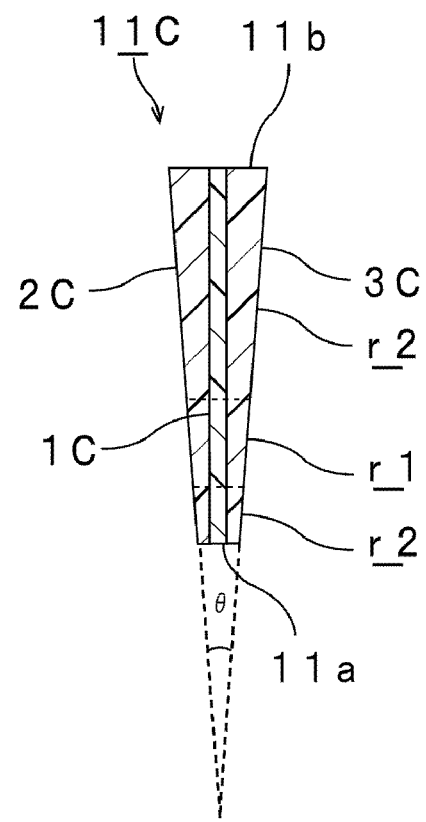

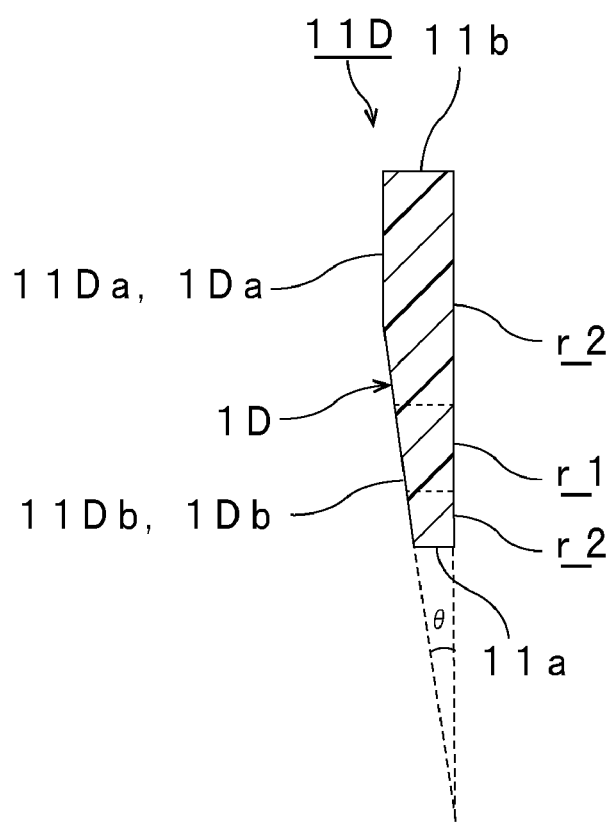
[FIG. 5.]

[FIG. 6.]
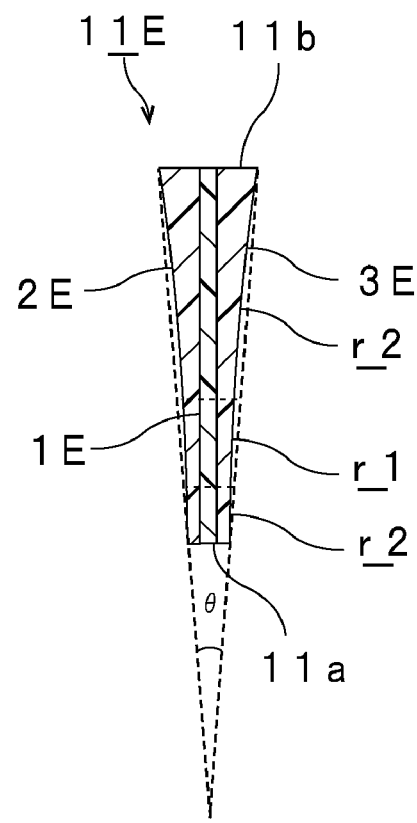

[FIG. 7.]
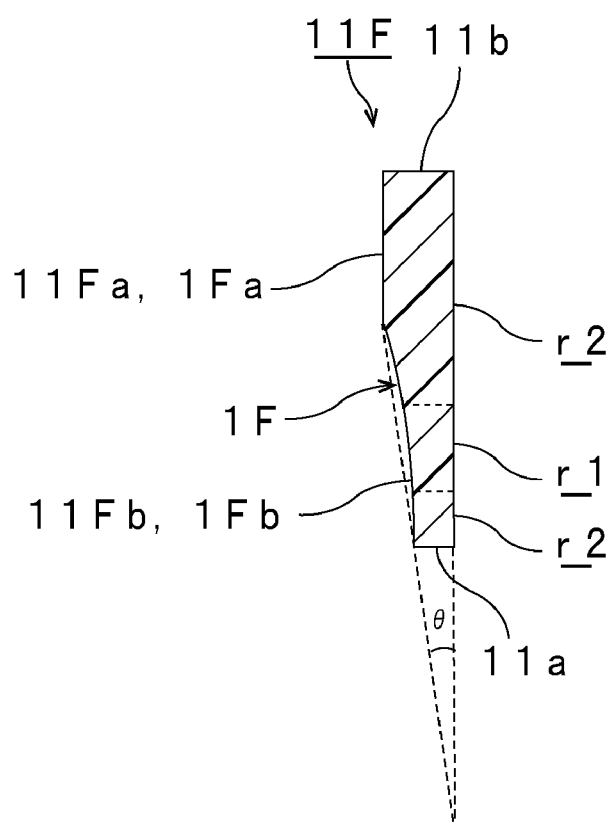

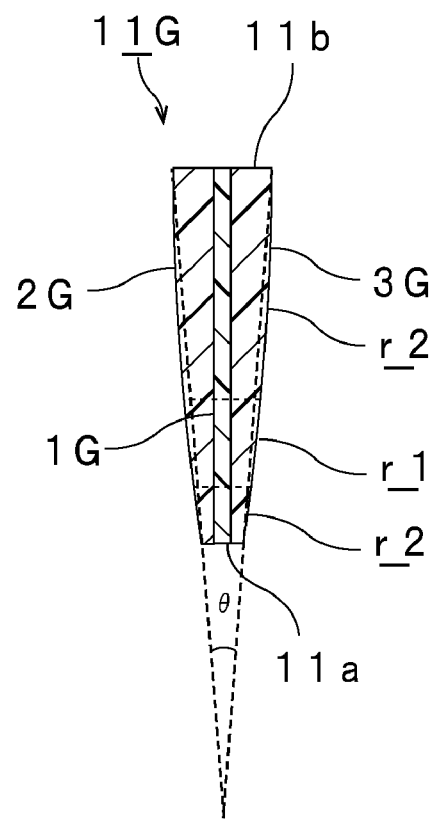
[FIG. 8.]

[FIG. 9.]
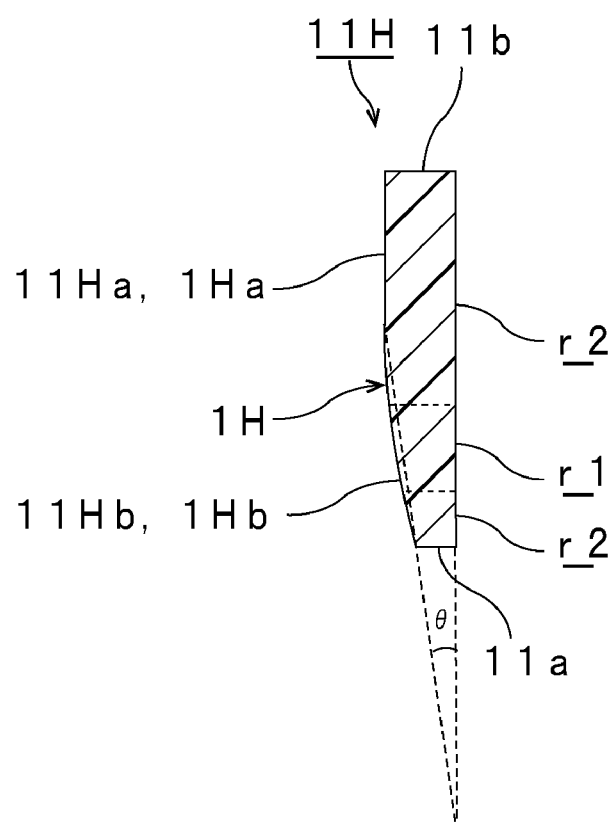

LAMINATED GLASS AND VEHICLE

TECHNICAL FIELD

The present invention relates to laminated glass. Also, the present invention relates to a vehicle in which the laminated glass is used.

BACKGROUND ART

Since laminated glass generates only a small amount of scattering glass fragments even when subjected to external impact and broken, laminated glass is excellent in safety. As such, laminated glass is widely used for automobiles, railway vehicles, aircraft, ships, buildings and the like. Laminated glass is produced by sandwiching an interlayer film between a pair of glass plates (lamination glass members).

In recent years, development of self-driving vehicles is proceeded. In a self-driving vehicle, the periphery of the vehicle is sensed by a remote sensing device such as LiDAR (Light Detection And Ranging) and the like. Also, the case where the remote sensing device is installed inside the vehicle is also assumed.

The following Patent Document 1 discloses an automobile glazing comprising (a) at least one glass sheet having an absorption coefficient of less than 5 $m^{-1}$ in a wavelength region of 1051 nm to 1650 nm, and having an external face and an internal face, and (b) an infrared filter. In the automobile glazing, an infrared-based remote sensing device in a wavelength region of 1051 nm to 1650 nm is arranged in a zone on the internal face of the glass sheet where the infrared filter layer is absent.

RELATED ART DOCUMENT

Patent Document

Patent Document 1: WO2018/178278A1

SUMMARY OF THE INVENTION

Problems to be Solved by the Invention

When a remote sensing device is installed inside the vehicle, the light applied from the remote sensing device is required to penetrate laminated glass. However, conventional laminated glass sometimes cannot satisfactorily transmit the light applied from the remote sensing device.

In order to transmit light applied from the remote sensing device satisfactorily, it is conceivable to use a lamination glass member having higher light transmittance than a conventional glass member (for example, clear glass or green glass) as a lamination glass member. However, when a lamination glass member having high light transmittance is used, the heat shielding property of the laminated glass decreases.

It is an object of the present invention to provide a laminated glass capable of transmitting light applied from the remote sensing device satisfactorily, and enhancing the heat shielding property. It is also an object of the present invention to provide a vehicle in which the laminated glass is used.

Means for Solving the Problems

According to a broad aspect of the present invention, there is provided a laminated glass including a first lamination glass member, a second lamination glass member, and an interlayer film, the interlayer film being arranged between the first lamination glass member and the second lamination glass member, the first lamination glass member having a light transmittance of 85% or more at every wavelength within a range of 380 nm to 2500 nm, the laminated glass having a first region and a second region, the second region having a light transmittance of higher than a light transmittance of the first region by 5% or more at at least one wavelength within a range of 380 nm to 2500 nm.

In a specific aspect of the laminated glass according to the present invention, light transmittance of the second region is higher than light transmittance of the first region by 5% or more at at least one wavelength within a range of 780 nm to 1000 nm.

In a specific aspect of the laminated glass according to the present invention, light transmittance of the second region is 90% or more at at least one wavelength within a range of 780 nm to 1000 nm.

In a specific aspect of the laminated glass according to the present invention, a region of 0 cm to 30 cm from at least one end part of the laminated glass to the inner side of the laminated glass has the second region.

In a specific aspect of the laminated glass according to the present invention, the interlayer film contains a pigment in a region corresponding to the first region.

In a specific aspect of the laminated glass according to the present invention, the interlayer film contains a heat shielding substance in a region corresponding to the first region.

In a specific aspect of the laminated glass according to the present invention, the interlayer film contains a cyclic cyanine compound, inorganic oxide particles, or carbon black in a region corresponding to the first region.

In a specific aspect of the laminated glass according to the present invention, the inorganic oxide particles include cesium-doped tungsten oxide particles, or tin-doped indium oxide particles.

In a specific aspect of the laminated glass according to the present invention, light transmittance of the second lamination glass member is 85% or more at every wavelength within a range of 380 nm to 2500 nm.

In a specific aspect of the laminated glass according to the present invention, at least one of the first lamination glass member and the second lamination glass member is extra clear glass.

In a specific aspect of the laminated glass according to the present invention, the interlayer film contains a heat reflective film in a region corresponding to the first region.

According to a broad aspect of the present invention, there is provided a vehicle including a vehicle body, the above-described laminated glass, and a remote sensing device capable of applying light, the remote sensing device being arranged at such a position that light applied from the remote sensing device can penetrate the second region of the laminated glass.

In a specific aspect of the vehicle according to the present invention, the remote sensing device is a remote sensing device capable of applying an infrared ray, and the remote sensing device is arranged at such a position that the infrared ray applied from the remote sensing device can penetrate the second region of the laminated glass.

In a specific aspect of the vehicle according to the present invention, the remote sensing device is a LiDAR that enables 3D mapping of a peripheral environment of the vehicle, and is a scanning LiDAR, a rotating LiDAR, a flash LiDAR or a solid state LiDAR.

Effect of the Invention

The laminated glass according to the present invention is a laminated glass including a first lamination glass member, a second lamination glass member, and an interlayer film, and the interlayer film is arranged between the first lamination glass member and the second lamination glass member. In the laminated glass according to the present invention, light transmittance of the first lamination glass member is 85% or more at every wavelength within a range of 380 nm to 2500 nm. The laminated glass according to the present invention has a first region and a second region, and the second region has a light transmittance higher than a light transmittance of the first region by 5% or more at at least one wavelength within a range of 380 nm to 2500 nm. In the laminated glass according to the present invention, since the above configuration is provided, it is possible to transmit light applied from the remote sensing device satisfactorily, and it is possible to enhance the heat shielding property.

BRIEF DESCRIPTION OF DRAWINGS

FIG. 1 is a sectional view schematically showing laminated glass in accordance with a first embodiment of the present invention.

FIG. 2 is a sectional view schematically showing laminated glass in accordance with a second embodiment of the present invention.

FIG. 3 is a sectional view schematically showing a laminated glass in accordance with a third embodiment of the present invention.

FIG. 4 is a sectional view schematically showing an interlayer film of a third modified example that can be used in laminated glass.

FIG. 5 is a sectional view schematically showing an interlayer film of a fourth modified example that can be used in laminated glass.

FIG. 6 is a sectional view schematically showing an interlayer film of a fifth modified example that can be used in laminated glass.

FIG. 7 is a sectional view schematically showing an interlayer film of a sixth modified example that can be used in laminated glass.

FIG. 8 is a sectional view schematically showing an interlayer film of a seventh modified example that can be used in laminated glass.

FIG. 9 is a sectional view schematically showing an interlayer film of an eighth modified example that can be used in laminated glass.

MODES FOR CARRYING OUT THE INVENTION

Hereinafter, the details of the present invention will be described.

It is to be noted that the numeric range indicated by numbers intervened by "to" in the present specification includes the numbers on both sides as the upper limit value and the lower limit value. For example, "380 nm to 2500 nm" means "380 nm or more and 2500 nm or less".

The laminated glass according to the present invention is a laminated glass including a first lamination glass member, a second lamination glass member, and an interlayer film (interlayer film for laminated glass), and the interlayer film is arranged between the first lamination glass member and the second lamination glass member. In the laminated glass according to the present invention, light transmittance of the first lamination glass member is 85% or more at every wavelength within a range of 380 nm to 2500 nm. The laminated glass according to the present invention has a first region and a second region, and the second region has a light transmittance higher than a light transmittance of the first region by 5% or more at at least one wavelength within a range of 380 nm to 2500 nm.

In recent years, development of self-driving vehicles equipped with a remote sensing device is proceeded. When a remote sensing device is installed inside the vehicle, the light applied from the remote sensing device is required to penetrate laminated glass.

In order to transmit the light applied from the remote sensing device satisfactorily, it is conceivable to use a lamination glass member having higher light transmittance than a conventional glass member as a lamination glass member. However, when a lamination glass member having high light transmittance is used, the heat shielding property of the laminated glass decreases. In particular, when an infrared ray is used as light applied from the remote sensing device, the heat shielding property of the laminated glass decreases as the infrared transmittance is increased.

For addressing to this, in the laminated glass according to the present invention, since a laminated glass having a light transmittance of 85% or more at every wavelength within a range of 380 nm to 2500 nm is used as the first lamination glass member, it is possible to transmit the light applied from the remote sensing device satisfactorily. Also, in the laminated glass according to the present invention, in addition to use of a specific first lamination glass member, the laminated glass has a first region and a second region having mutually different light transmittances. Therefore, in the laminated glass according to the present invention, it is possible to transmit the light applied from the remote sensing device satisfactorily in the second region, and it is possible to enhance the heat shielding property in the first region. In the laminated glass according to the present invention, it is possible to enhance the heat shielding property despite the use of the first lamination glass member having a light transmittance of 85% or more.

The lamination glass member having a light transmittance of 85% or more is a lamination glass member having higher light transmittance than a lamination glass member such as clear glass and green glass that is generally used in laminated glass.

Hereinafter, specific embodiments of the present invention will be described with reference to the drawings.

FIG. 1 is a sectional view schematically showing laminated glass in accordance with a first embodiment of the present invention.

A laminated glass 31 shown in FIG. 1 includes a first lamination glass member 21, a second lamination glass member 22 and an interlayer film 11. In FIG. 1, a cross section in the thickness direction of the laminated glass 31, the first lamination glass member 21, the second lamination glass member 22, and the interlayer film 11 is shown.

The interlayer film 11 has a first layer 1, a second layer 2, and a third layer 3. The interlayer film 11 has a three-layer structure. The second layer 2 is arranged on a first surface side of the first layer 1 to be layered thereon. The third layer 3 is arranged on a second surface side opposite to the first surface of the first layer 1 to be layered thereon.

The first lamination glass member 21 is layered on a first surface of the interlayer film 11. The second lamination glass member 22 is layered on a second surface opposite to the first surface of the interlayer film 11. The first lamination glass member 21 is layered on an outer surface of the second layer 2. The second lamination glass member 22 is layered on an outer surface of the third layer 3.

The laminated glass 31 has a first region R1, and a second region R2. The second region R2 is a region having a higher light transmittance by 5% or more than the first region R1 at at least one wavelength within a range of 380 nm to 2500 nm. The laminated glass 31 has the first region R1 (first first region R1), the second region R2, and the first region R1 (second first region R1) in this order from one end part (one end) toward the other end part (other part) of the laminated glass 31. The first region R1 located on the other end part side of the laminated glass 31 may be replaced by the second region R2. In this case, the laminated glass has the first region R1 and the second region R2 in this order from the one end part toward the other end part.

In the laminated glass 31, it is possible to transmit light L applied from a remote sensing device 51 satisfactorily in the second region R2, and it is possible to enhance the heat shielding property in the first region R1. As a result, in the laminated glass 31, it is possible to transmit the light L applied from the remote sensing device 51 satisfactorily, and it is possible to enhance the heat shielding property.

FIG. 2 is a sectional view schematically showing laminated glass in accordance with a second embodiment of the present invention.

A laminated glass 31A shown in FIG. 2 includes the first lamination glass member 21, the second lamination glass member 22 and an interlayer film 11A. The interlayer film 11A is an interlayer film of a first modified example that can be used in laminated glass. In FIG. 2, a cross section in the thickness direction of the laminated glass 31A, the first lamination glass member 21, the second lamination glass member 22, and the interlayer film 11A is shown.

The interlayer film 11A is a one-layer interlayer film having a one-layer structure. The interlayer film 11A is a first layer.

The first lamination glass member 21 is layered on a first surface of the interlayer film 11A. The second lamination glass member 22 is layered on a second surface opposite to the first surface of the interlayer film 11A.

The laminated glass 31A has the first region R1, and the second region R2. The second region R2 is a region having a higher light transmittance by 5% or more than the first region R1 at at least one wavelength within a range of 380 nm to 2500 nm. The laminated glass 31A has the first region R1 (first first region Rh), the second region R2, and the first region R1 (second first region R1) in this order from one end part (one end) toward the other end part (other part) of the laminated glass 31A. The first region R1 located on the other end part side of the laminated glass 31A may be replaced by the second region R2.

In the laminated glass 31A, it is possible to transmit light L applied from the remote sensing device 51 satisfactorily in the second region R2, and it is possible to enhance the heat shielding property in the first region R1. As a result, in the laminated glass 31A, it is possible to transmit the light L applied from the remote sensing device 51 satisfactorily, and it is possible to enhance the heat shielding property.

FIG. 3 is a sectional view schematically showing a laminated glass in accordance with a third embodiment of the present invention.

A laminated glass 31B shown in FIG. 3 includes the first lamination glass member 21, the second lamination glass member 22 and an interlayer film 11B. The interlayer film 11B is an interlayer film of a second modified example that can be used in laminated glass. In FIG. 3, a cross section in the thickness direction of the laminated glass 31B, the first lamination glass member 21, the second lamination glass member 22, and the interlayer film 11B is shown.

The interlayer film 11B has a first layer 1B, a second layer 2B, and a third layer 3B. The interlayer film 11B partially has a three-layer structure, and partially has a two-layer structure. In the three-layer part, the second layer 2B is arranged on a first surface side of the first layer 1B to be layered thereon. In the three-layer part, the third layer 3B is arranged on a second surface side opposite to the first surface of the first layer 1B to be layered thereon. In the two-layer part, the third layer 3B is arranged on one side of the second layer 2B, the second layer 2B is arranged on one side of the third layer 3B, and the second layer 2B and the third layer 3B are laminated.

The first lamination glass member 21 is layered on a first surface of the interlayer film 11B. The second lamination glass member 22 is layered on a second surface opposite to the first surface of the interlayer film 11B. The first lamination glass member 21 is layered on an outer surface of the second layer 2B. The second lamination glass member 22 is layered on an outer surface of the third layer 3B.

The laminated glass 31B has the first region R1, and the second region R2. The second region R2 is a region having a higher light transmittance by 5% or more than the first region R1 at at least one wavelength within a range of 380 nm to 2500 nm. The laminated glass 31B has the first region R1 (first first region R1), the second region R2, and the first region R1 (second first region R1) in this order from one end part (one end) toward the other end part (other part) of the laminated glass 31B. The first region R1 located on the other end part side of the laminated glass 31B may be replaced by the second region R2.

The laminated glass 31B has a three-layer structure in the first region R1. The laminated glass 31B has a two-layer structure in the second region R2.

In the laminated glass 31B, it is possible to transmit light L applied from the remote sensing device 51 satisfactorily in the second region R2, and it is possible to enhance the heat shielding property in the first region R1. As a result, in the laminated glass 31B, it is possible to transmit the light L applied from the remote sensing device 51 satisfactorily, and it is possible to enhance the heat shielding property.

FIG. 4 is a sectional view schematically showing an interlayer film of a third modified example that can be used in laminated glass. In FIG. 4, a cross section in the thickness direction of an interlayer film 11C is shown. The interlayer film 11C shown in FIG. 4, and interlayer films 11D, 11E, 11F, 11G, 11H shown in FIG. 5 to FIG. 9 are used together with the first lamination glass member and the second lamination glass member for obtaining laminated glass. The size and dimension of the interlayer films 11C, 11D, 11E, 11F, 11G, 11H shown in FIG. 4 to FIG. 9 are appropriately changed from the actual size and shape for convenience of illustration. In FIG. 4 to FIG. 9, the first region R1 and the second region R2 are not shown. The interlayer films 11C, 11D, 11E, 11F, 11G, 11H have the first region R1 and the second region R2 (not shown).

The interlayer film 11C includes a first layer 1C (intermediate layer), a second layer 2C (surface layer), and a third layer 3C (surface layer). The second layer 2C is arranged on a first surface side of the first layer 1C to be layered thereon. The third layer 3C is arranged on a second surface side opposite to the first surface of the first layer 1C to be layered thereon. The first layer 1C is arranged between the second layer 2C and the third layer 3C to be sandwiched therebetween. The interlayer film 11C is a multilayer interlayer film.

The interlayer film 11C has one end 11a (one end part) and the other end 11b (the other end part) being on an opposite side of the one end 11a. The one end 11a and the other end 11b are end parts of both sides facing each other. The sectional shape in the thickness direction of each of the second layer 2C and the third layer 3C is a wedge-like shape. The sectional shape in the thickness direction of the first layer 1C is a rectangular shape. The thicknesses of the second layer 2C and the third layer 3C are larger on the other end 11b side than on the one end 11a side. Accordingly, the thickness of the other end 11b of the interlayer film 11C is larger than the thickness of the one end 11a thereof. Accordingly, the interlayer film 11C has a region being thin in thickness and a region being thick in thickness.

The interlayer film 11C has a region where the thickness increases from the one end 11a side to the other end 11b side. In the interlayer film 11C, the increment of the thickness is constant from the one end 11a side to the other end 11b side in the region where the thickness increases.

The interlayer film 11C has a region for display r1 corresponding to a display region of a head-up display. The interlayer film 11C has a surrounding region r2 neighboring the region for display r1. In the present specification, region for display is described as "region for display r1" in distinction from "first region R1", and surrounding region is described as "surrounding region r2" in distinction from "second region R2".

The interlayer film has a shape as shown in FIG. 4, and may have a one-layer structure, a two-layer structure or four or more-layer structure.

FIG. 5 is a sectional view schematically showing an interlayer film of a third modified example that can be used in laminated glass. In FIG. 5, a cross section in the thickness direction of the interlayer film 11D is shown.

The interlayer film 11D includes a first layer 1D. The interlayer film 11D has a one-layer structure composed only of the first layer 1D and is a one-layer interlayer film. The interlayer film 11D is the first layer 1D.

The interlayer film 11D has one end 11a and the other end lib at the opposite side of the one end 11a. The one end 11a and the other end lib are end parts of both sides facing each other. The thickness of the other end lib of the interlayer film 11D is larger than the thickness of the one end 11a thereof. Accordingly, the interlayer film 11D and the first layer 1D has a region being thin in thickness and a region being thick in thickness.

The interlayer film 11D has a region where the thickness increases from the one end 11a side to the other end lib side. In the interlayer film 11D, the increment of the thickness is constant from the one end 11a side to the other end 11b side in the region where the thickness increases.

The interlayer film 11D and the first layer 1D have portions 11Da, 1Da having a rectangular sectional shape in the thickness direction, and portions 11db, 1db having a wedge-like sectional shape in the thickness direction.

The interlayer film 11D has the region for display r1 corresponding to a display region of a head-up display. The interlayer film 11D has the surrounding region r2 neighboring the region for display r1.

The interlayer film has the shape shown in FIG. 5 and may have a two or more-layer structure.

FIG. 6 is a sectional view schematically showing an interlayer film of a fifth modified example that can be used in laminated glass. In FIG. 6, a cross section in the thickness direction of the interlayer film 11E is shown.

The interlayer film 11E includes a first layer 1E (intermediate layer), a second layer 2E (surface layer), and a third layer 3E (surface layer). The interlayer film 11C and the interlayer film 11E are different from each other in the increment of the thickness in the region where the thickness increases.

The interlayer film 11E has a region where the thickness increases from the one end 11a side to the other end 11b side. The interlayer film 11E has a portion where the increment in thickness increases from the one end 11a side to the other end 11b side in the region where the thickness increases. The interlayer film 11E has a region with a wedge-like sectional shape in the thickness direction. The interlayer film 11E has a portion where the wedge angle increases from the one end side to the other end side in the region with a wedge-like sectional shape in the thickness direction.

FIG. 7 is a sectional view schematically showing an interlayer film of a sixth modified example that can be used in laminated glass. In FIG. 7, a cross section in the thickness direction of the interlayer film 11F is shown.

The interlayer film 11F includes a first layer 1F. The interlayer film 11F has a one-layer structure composed only of the first layer 1F and is a one-layer interlayer film. The interlayer film 11D and the interlayer film 11F are different from each other in the increment of the thickness in the region where the thickness increases.

The interlayer film 11F has a region where the thickness increases from the one end 11a side to the other end 11b side. The interlayer film 11F has a portion where the increment in thickness increases from the one end 11a side to the other end 11b side in the region where the thickness increases. The interlayer film 11F has a region with a wedge-like sectional shape in the thickness direction. The interlayer film 11F has a portion where the wedge angle increases from the one end side to the other end side in the region with a wedge-like sectional shape in the thickness direction.

The interlayer film 11F and the first layer 1F have portions 11Fa, 1Fa having a rectangular sectional shape in the thickness direction, and portions 11Fb, 1Fb having a wedge-like sectional shape in the thickness direction.

FIG. 8 is a sectional view schematically showing an interlayer film of a seventh modified example that can be used in laminated glass. In FIG. 8, a cross section in the thickness direction of an interlayer film 11G is shown.

The interlayer film 11G includes a first layer 1G (intermediate layer), a second layer 2G (surface layer), and a third layer 3G (surface layer). The interlayer film 11C and the interlayer film 11G are different from each other in the increment of the thickness in the region where the thickness increases.

The interlayer film 11G has a region where the thickness increases from the one end 11a side to the other end 11b side. The interlayer film 11G has a portion where the increment in thickness decreases from the one end 11a side to the other end 11b side in the region where the thickness increases. The interlayer film 11G has a region with a wedge-like sectional shape in the thickness direction. The interlayer film 11G has a portion where the wedge angle decreases from the one end side to the other end side in the region with a wedge-like sectional shape in the thickness direction.

FIG. 9 is a sectional view schematically showing an interlayer film of an eighth modified example that can be used in laminated glass. In FIG. 9, a cross section in the thickness direction of the interlayer film 11H is shown.

The interlayer film 11H includes a first layer 1H. The interlayer film 11H has a one-layer structure composed only of the first layer 1H and is a one-layer interlayer film. The interlayer film 11D and the interlayer film 11H are different from each other in the increment of the thickness in the region where the thickness increases.

The interlayer film 11H has a region where the thickness increases from the one end 11a side to the other end 11b side. The interlayer film 11H has a portion where the increment in thickness decreases from the one end 11a side to the other end 11b side in the region where the thickness increases. The interlayer film 11H has a region with a wedge-like sectional shape in the thickness direction. The interlayer film 11H has a portion where the wedge angle decreases from the one end side to the other end side in the region with a wedge-like sectional shape in the thickness direction.

The interlayer film 11H and the first layer 1H have portions 11Ha, 1Ha having a rectangular sectional shape in the thickness direction, and portions 11Hb, 1Hb having a wedge-like sectional shape in the thickness direction.

In the laminated glass according to the present invention, the light transmittance of the second region is higher than the light transmittance of the first region by 5% or more at at least one wavelength within a range of 380 nm to 2500 nm. The second region is a region having a higher light transmittance by 5% or more than the first region at at least one wavelength within a range of 380 nm to 2500 nm.

At at least one wavelength within the range of 380 nm to 2500 nm, light transmittance of the second region is higher than light transmittance of the first region preferably by 10% or more, more preferably by 15% or more, further preferably by 20% or more, especially preferably by 25% or more. In this case, it is possible to transmit the light applied from the remote sensing device more satisfactorily.

At at least one wavelength within the range of 380 nm to 2500 nm, light transmittance of the second region is higher than light transmittance of the first region preferably by 95% or less, more preferably by 90% or less, further preferably by 80% or less. In this case, it is possible to further enhance the heat shielding property.

At at least one wavelength within the range of 780 nm to 1000 nm, light transmittance of the second region is higher than light transmittance of the first region preferably by 5% or more, more preferably by 10% or more, still more preferably by 15% or more, further preferably by 20% or more, especially preferably by 25% or more. In this case, when the light applied from the remote sensing device is infrared light, it is possible to transmit the infrared light more satisfactorily.

At at least one wavelength within the range of 780 nm to 1000 nm, light transmittance of the second region is higher than light transmittance of the first region preferably by 95% or less, more preferably by 90% or less, further preferably by 80% or less. In this case, even when the light applied from the remote sensing device is infrared light, it is possible to further enhance the heat shielding property.

At at least one wavelength within the range of 380 nm to 2500 nm, light transmittance of the second region is preferably 85% or more, more preferably 90% or more, further preferably 92% or more. When the light transmittance is the above lower limit or more, it is possible to transmit the light applied from the remote sensing device more satisfactorily. At at least one wavelength within the range of 380 nm to 2500 nm, light transmittance of the second region may be 100% or less, may be less than 100%, or may be 99% or less.

At at least one wavelength within the range of 780 nm to 1000 nm, light transmittance of the second region is preferably 85% or more, more preferably 90% or more, further preferably 92% or more. When the light transmittance is the above lower limit or more, it is possible to transmit infrared rays more satisfactorily when the light applied from the remote sensing device is infrared rays. At at least one wavelength within the range of 780 nm to 1000 nm, light transmittance of the second region may be 100% or less, may be less than 100%, or may be 99% or less.

At at least one wavelength within the range of 780 nm to 1000 nm, light transmittance of the first region is preferably 80% or less, more preferably 65% or less, further preferably 45% or less. When the light transmittance is the above upper limit or less, it is possible to further enhance the heat shielding property. At at least one wavelength within the range of 780 nm to 1000 nm, light transmittance of the first region may be 10% or more, may be 25% or more, or may be 40% or more.

Light transmittance of the laminated glass is measured in accordance with JIS R3106:1998 or JIS R3212:1998 using a spectrophotometer (for example, "U-4100" available from Hitachi High-Tech Corporation).

In the first region, the light transmittance may be uniform, may be approximately uniform, or may vary.

Visible light transmittance of the first region is preferably 50% or more, more preferably 60% or more, further preferably 70% or more. Visible light transmittance of the first region may be 95% or less, may be 90% or less, may be 85% or less, or may be 80% or less.

Visible light transmittance of the second region may be 50% or more, may be 60% or more, may be 70% or more, may be 95% or less, may be 90% or less, may be 85% or less, or may be 80% or less.

Visible light transmittance of the laminated glass is measured at a wavelength of 380 nm to 780 nm by using a spectrophotometer (for example, "U-4100" available from Hitachi High-Tech Corporation) in accordance with JIS R3106:1998.

In 100% of the total plane area of the laminated glass, the plane area of the first region is preferably 50% or more, more preferably 60% or more, further preferably 70% or more, and is preferably 99% or less, more preferably 95% or less, further preferably 90% or less, especially preferably 80% or less. When the plane area of the first region is the above lower limit or more and the above upper limit or less, it is possible to further enhance the heat shielding property.

In 100% of the total plane area of the laminated glass, the plane area of the second region is preferably 1% or more, more preferably 5% or more, further preferably 10% or more, especially preferably 20% or more, and is preferably 50% or less, more preferably 40% or less, further preferably 30% or less. When the plane area of the second region is the above lower limit or more and the above upper limit or less, it is possible to transmit the light applied from the remote sensing device more satisfactorily.

It is preferred that the plane area of the first region is larger than the plane area of the second region.

An absolute value of difference between the plane area of the first region in 100% of the total plane area of the laminated glass and the plane area of the second region in 100% of the total plane area of the laminated glass is preferably 0.1% or more, more preferably 1% or more, further preferably 3% or more, and is preferably 30% or less, more preferably 20% or less, further preferably 10% or less. When the absolute value of difference is the above lower limit or more and the above upper limit or less, it is possible to exert the effect of the present invention more effectively.

In L*a*b* color system of the first region, a* is preferably −5 or more, more preferably −3 or more, and is preferably 5 or less, more preferably 3 or less. When the a* is the above lower limit or more and the above upper limit or less, it is possible to prevent the transmitted color from being greenish or reddish.

In L*a*b* color system of the first region, b* is preferably −3 or more, more preferably −1 or more, and is preferably 10 or less, more preferably 8 or less. When the b* is the above lower limit or more and the above upper limit or less, it is possible to prevent the transmitted color from being bluish or yellowish.

In L*a*b* color system of the second region, a* is preferably −5 or more, more preferably −3 or more, and is preferably 5 or less, more preferably 3 or less. When the a* is the above lower limit or more and the above upper limit or less, it is possible to prevent the transmitted color from being greenish or reddish.

In L*a*b* color system of the second region, b* is preferably −3 or more, more preferably −1 or more, and is preferably 10 or less, more preferably 8 or less. When the b* is the above lower limit or more and the above upper limit or less, it is possible to prevent the transmitted color from being bluish or yellowish.

In L*a*b* color system of the first region and the second region, a* and b* are measured in accordance with JIS Z8781-4:2013.

The laminated glass may have the first region, the second region, and the first region in this order, or may have the first region and the second region in this order from the one end part toward the other end part. The laminated glass may have one first region, may have a plurality of first regions, may have one second region, or may have a plurality of second regions. The laminated glass may have a second region, and first regions on both sides of the second region. The laminated glass may have a first region, and second regions on both sides of the first region. The laminated glass may have a first region on one end part side, and a second region on the other end part side. The laminated glass may have a first region on one end part side, a first region on the other end part side, and a second region between the two first regions. The laminated glass may have a first region on a side closer to one end part than a second region, and the second region on a side closer to the other end part of the laminated glass than the first region. The laminated glass may have a first region on a side closer to the other end part of the laminated glass than a second region.

In a plan view of the laminated glass, the second region may exist in a band-like shape, or may exist in a dot-like shape, or may exist in a lattice-like shape.

In a plan view of the laminated glass, the second region may be surrounded by the first region.

It is preferred that a region of 0 cm to 30 cm from at least one end part of the laminated glass to the inner side of the laminated glass has the second region. In this case, the entire second region may exist in the region of 0 cm to 30 cm, or a part of the second region may exist in the region of 0 cm to 30 cm.

The interlayer film has one end (one end part) and the other end being at an opposite side of the one end (other end part). The one end and the other end are both end parts facing each other in the interlayer film.

The interlayer film may be an interlayer film in which the thickness of the one end and the thickness of the other end are the same, or may be an interlayer film in which the thickness of the other end is larger than the thickness of the one end. The interlayer film may be an interlayer film having a uniform thickness, or may be an interlayer film having varying thickness. The sectional shape of the interlayer film may be a rectangular shape or may be a wedge-like shape.

The laminated glass may be a head-up display. When the laminated glass is a head-up display, the laminated glass has a display region of the head-up display. The display region is a region capable of favorably displaying information. For example, by using the interlayer film 11C, 11D, 11E, 11F, 11G, 11H, the first lamination glass member, and the second lamination glass member, a laminated glass which is a head-up display can be obtained.

A head-up display system can be obtained by using the aforementioned head-up display. The head-up display system includes the laminated glass, and a light source device for irradiating the laminated glass with light for image display. The light source device can be attached, for example, to a dashboard in a vehicle. By irradiating the display region of the laminated glass with light from the light source device, it is possible to achieve image display.

It is preferred that the interlayer film have a portion having a wedge-like sectional shape in the thickness direction. It is preferred that the interlayer film have a portion where the thickness gradually increases from one end toward the other end. It is preferred that the sectional shape in the thickness direction of the interlayer film be a wedge-like shape. Examples of the sectional shape in the thickness direction of the interlayer film include a trapezoidal shape, a triangular shape, a pentagonal shape, and the like.

In the above-described interlayer film, the thickness may not increase evenly from the one end toward the other end of the interlayer film. The above-described interlayer film may have a projecting portion on the surface, or a recess portion on the surface.

From the viewpoint of further suppressing double images, it is preferred that the interlayer film have a portion where the increment in thickness increases from one end side toward the other end side in the region where the thickness increases, or a portion where the increment in thickness decreases from one end side toward the other end side in the region where the thickness increases. The interlayer film may have a portion where the increment in thickness increases from one end side toward the other end side in the region where the thickness increases, or may have a portion where the increment in thickness decreases from one end side toward the other end side in the region where the thickness increases. From the viewpoint of further suppressing double images, it is preferred that the interlayer film have a portion where the wedge angle increases from one end side toward the other end side in the region with a wedge-like sectional shape in the thickness direction, or a portion where the wedge angle decreases from one end side toward the other end side in the region with a wedge-like sectional shape in the thickness direction. The interlayer film may have a portion where the wedge angle increases from one end side toward the other end side in the region with a wedge-like sectional shape in the thickness direction, or may have a portion where the wedge angle decreases from one end side toward the other end side in the region with a wedge-like sectional shape in the thickness direction.

In order to suppress double images, the wedge angle (θ) of the interlayer film can be appropriately set according to the fitting angle of laminated glass. The wedge angle (θ) is a wedge angle in the entire interlayer film. From the viewpoint of further suppressing double images, the wedge angle (θ) of the interlayer film is preferably 0.1 mrad (0.00575 degrees) or more, and more preferably 0.2 mrad (0.0115 degrees) or more. When the wedge angle (θ) is the above lower limit or more, it is possible to obtain laminated glass suited for cars such as a truck or a bus in which the attachment angle of the windshield is large.

From the viewpoint of further suppressing double images, the wedge angle (θ) of the interlayer film is preferably 2 mrad (0.1146 degrees) or less, and more preferably 0.7 mrad (0.0401 degrees) or less. When the wedge angle (θ) is the above upper limit or less, it is possible to obtain laminated glass suited for cars such as a sports car in which the attachment angle of the windshield is small.

In order to suppress double images, the wedge angle (θ) of laminated glass can be appropriately set according to the fitting angle of laminated glass. The wedge angle (θ) is a wedge angle in the entire laminated glass. From the viewpoint of further suppressing double images, the wedge angle (θ) of the laminated glass is preferably 0.1 mrad (0.00575 degrees) or more, and more preferably 0.2 mrad (0.0115 degrees) or more. When the wedge angle (θ) is the above lower limit or more, the laminated glass is suited for cars such as a truck or a bus in which the attachment angle of the windshield is large.

From the viewpoint of further suppressing double images, the wedge angle (θ) of the laminated glass is preferably 2 mrad (0.1146 degrees) or less, and more preferably 0.7 mrad (0.0401 degrees) or less. When the wedge angle (θ) is the above upper limit or less, the laminated glass is suited for cars such as a sports car in which the attachment angle of the windshield is small.

The wedge angle (θ) of the interlayer film is an interior angle formed at the intersection point between a straight line connecting surface parts on one side of the interlayer film (first surface portion) of the maximum thickness portion and the minimum thickness portion in the interlayer film, and a straight line connecting surface parts of the other side of the interlayer film (second surface portion) of the maximum thickness portion and the minimum thickness portion in the interlayer film. The wedge angle (θ) of the laminated glass can be determined in the same manner as the wedge angle (θ) of the interlayer film.

When there are a plurality of maximum thicknesses parts, there are a plurality of minimum thicknesses parts, or the minimum thickness part is located in a certain region, the maximum thickness part and the minimum thickness part for determining the wedge angle (θ) are selected such that the wedge angle (θ) to be determined is the maximum.

The thickness of the interlayer film is not particularly limited. The thickness of the interlayer film refers to the total thickness of the respective layers constituting the interlayer film. Also, when the thickness of the interlayer film is not uniform, the thickness of the interlayer film indicates an average thickness.

The maximum thickness of the interlayer film is preferably 0.1 mm or more, more preferably 0.25 mm or more, further preferably 0.5 mm or more, especially preferably 0.8 mm or more and is preferably 3 mm or less, more preferably 2 mm or less, further preferably 1.5 mm or less.

A distance between the one end and the other end is defined as X. It is preferred that the interlayer film have a minimum thickness in the region at a distance of 0X to 0.2× inwardly from the one end, and a maximum thickness in the region at a distance of 0X to 0.2× inwardly from the other end. It is more preferred that the interlayer film have a minimum thickness in the region at a distance of 0X to 0.1× inwardly from the one end, and a maximum thickness in the region at a distance of 0X to 0.1× inwardly from the other end. It is further preferred that the interlayer film have a minimum thickness at the one end and the interlayer film have a maximum thickness at the other end.

The interlayer films 11C, 11D, 11E, 11F, 11G, 11H have a maximum thickness at the other end 1ib and a minimum thickness at the one end 11a.

The interlayer film may have a uniform-thickness part.

The uniform-thickness part means that the variation in thickness does not exceed 10 μm per a distance range of 10 cm in the direction connecting the one end and the other end of the interlayer film. Therefore, the uniform-thickness part refers to the part where the variation in thickness does not exceed 10 μm per a distance range of 10 cm in the direction connecting the one end and the other end of the interlayer film. To be more specific, the uniform-thickness part refers to the part where the thickness does not vary at all in the direction connecting the one end and the other end of the interlayer film, or the thickness varies by 10 μm or less per a distance range of 10 cm in the direction connecting the one end and the other end of the interlayer film.

From the viewpoint of the practical aspect and the viewpoint of sufficiently enhancing the adhesive strength and the penetration resistance, the maximum thickness of a surface layer is preferably 0.001 mm or more, more preferably 0.2 mm or more, further preferably 0.3 mm or more, and is preferably 1 mm or less, and more preferably 0.8 mm or less.

From the viewpoint of the practical aspect and the viewpoint of sufficiently enhancing the penetration resistance, the maximum thickness of a layer (intermediate layer) arranged between two surface layers is preferably 0.001 mm or more, more preferably 0.1 mm or more, and further preferably 0.2 mm or more and is preferably 0.8 mm or less, more preferably 0.6 mm or less, and further preferably 0.3 mm or less.

The distance X between one end and the other end of the interlayer film is preferably 3 m or less, more preferably 2 m or less, especially preferably 1.5 m or less, and preferably 0.5 m or more, more preferably 0.8 m or more, and especially preferably 1 m or more.

As a measuring device for use for measurement of a wedge angle (θ) of the interlayer film, a wedge angle (θ) of the laminated glass, and a thickness of the interlayer film, a contact type thickness measuring instrument "TOF-4R" (available from Yamabun Electronics Co., Ltd.) or the like can be recited.

Measurement of the thickness is conducted such that the distance is the shortest from the one end toward the other end by using the above-described measuring device at a film conveyance speed of 2.15 mm/minute to 2.25 mm/minute.

As a measuring device for use for measurement of a wedge angle (θ) of the interlayer film, a wedge angle (θ) of the laminated glass, and a thickness of the interlayer film after the interlayer film is made into laminated glass, a non-contact type multilayer film thickness measuring instrument "OPTIGAUGE" (available from Lumetrics, Inc.) or the like can be recited. When the measuring machine is used, it is possible to measure the thickness of the interlayer film while the interlayer film is in the laminated glass.

Hereinafter, members used in the laminated glass according to the present invention are further described.

(First, Second Lamination Glass Members)

The first lamination glass member is a lamination glass member in which light transmittance is 85% or more at every wavelength within the range of 380 nm to 2500 nm.

At every wavelength within the range of 380 nm to 2500 nm, light transmittance of the first lamination glass member is 85% or more, preferably 87% or more, more preferably 90% or more, further preferably 92% or more. When the light transmittance of the first lamination glass member is the above lower limit or more, it is possible to transmit the light applied from the remote sensing device more satisfactorily. At every wavelength within the range of 380 nm to 2500 nm, light transmittance of the first lamination glass member may be 100% or less, may be less than 100%, or may be 99% or less.

At every wavelength within the range of 380 nm to 2500 nm, light transmittance of the second lamination glass member is preferably 80% or more, preferably 85% or more, still more preferably 87% or more, further preferably 90% or more, especially preferably 92% or more. When the light transmittance of the second lamination glass member is the above lower limit or more, it is possible to transmit the light applied from the remote sensing device more satisfactorily. At every wavelength within the range of 380 nm to 2500 nm, light transmittance of the second lamination glass member may be 100% or less, may be less than 100%, or may be 99% or less.

Light transmittance of the lamination glass member is measured in accordance with JIS R3106:1998 or JIS R3212:1998 using a spectrophotometer (for example, "U-4100" available from Hitachi High-Tech Corporation).

Examples of the lamination glass member in which light transmittance is 85% or more at every wavelength within the range of 380 nm to 2500 nm include extra clear glass and the like.

It is preferred that at least one of the first lamination glass member and the second lamination glass member be extra clear glass, and it is more preferred that both of the first lamination glass member and the second lamination glass member be extra clear glass. In this case, it is possible to transmit the light applied from the remote sensing device more satisfactorily.

Thickness of each of the first lamination glass member and the second lamination glass member is preferably 1.6 mm or more, more preferably 1.8 mm or more, and is preferably 2.5 mm or less, more preferably 2.3 mm or less.

Thickness of the first lamination glass member and thickness of the second lamination glass member may be the same or different from each other. An absolute value of difference between thickness of the first lamination glass member and thickness of the second lamination glass member may be 0 mm, may exceed 0 mm, may be 0.01 mm or more, may be 0.1 mm or more, or may be 0.2 mm or more. An absolute value of difference between thickness of the first lamination glass member and thickness of the second lamination glass member may be 2.0 mm or less, may be 1.0 mm or less, or may be 0.5 mm or less.

Examples of combination of thickness of the first lamination glass member and thickness of the second lamination glass member include a combination of 1.8 mm and 2.0 mm, a combination of 1.6 mm and 2.1 mm, a combination of 1.8 mm and 2.1 mm, and a combination of 2.0 mm and 2.5 mm.

Each of thickness of the first lamination glass member and thickness of the second lamination glass member is preferably 1.5 mm, 1.6 mm, 1.7 mm, 1.8 mm, 1.9 mm, 2.0 mm, 2.1 mm, 2.2 mm, 2.3 mm, 2.4 mm or 2.5 mm. In the preferred thickness, thickness of the first lamination glass member and thickness of the second lamination glass member may be the same or different from each other.

(Interlayer Film for a Laminated Glass)

The interlayer film may have a one-layer structure, a two-layer structure, a two or more-layer structure, a three-layer structure, a three or more-layer structure, a four or more-layer structure, a five or more-layer structure, or a six or more-layer structure.

The interlayer film includes at least the first layer. The interlayer film having a two or more-layer structure includes at least the first layer, and the second layer. In this case, the second layer is arranged on a first surface side of the first layer. The interlayer film having a three or more-layer structure includes at least the first layer, the second layer, and the third layer. In this case, the second layer is arranged on the first surface side of the first layer, and the third layer is arranged on a second surface side opposite to the first surface of the first layer.

The structure of the interlayer film may partially vary. The number of layers of the interlayer film may partially vary. The structure of the first region and the structure of the second region may be different from each other. The number of layers of the first region and the number of layers of the second region may be different from each other. For example, the interlayer film may have a part having a one-layer structure, and a part having a two or more-layer structure. The interlayer film may have a part having a one-layer structure, and a part having a three or more-layer structure. The interlayer film may have a part having a two-layer structure, and a part having a three or more-layer structure. From the viewpoint of exerting the effect of the present invention more effectively, it is preferred that the number of layers of the first region be larger than the number of layers of the second region.

The interlayer film has a region corresponding to the first region of the laminated glass, and a region corresponding to the second region of the laminated glass. By varying the number of layers of the interlayer film, or the ingredients contained in the interlayer film between the region corresponding to the first region and the region corresponding to the second region, it is possible to satisfactorily obtain laminated glass having the first region and the second region.

From the viewpoint of further enhancing the heat shielding property of the laminated glass, it is preferred that the interlayer film include a heat reflective film. From the viewpoint of further enhancing the heat shielding property of the laminated glass, it is preferred that the interlayer film include a heat reflective film in at least part in the planar direction of the interlayer film. From the viewpoint of transmitting light applied from the remote sensing device more satisfactorily, it is preferred that the interlayer film include a heat reflective film in part of the planar direction of the interlayer film. From the viewpoint of transmitting light applied from the remote sensing device more satisfactorily, it is preferred that the interlayer film does not include a heat reflective film in part of the planar direction of the interlayer film. From the viewpoint of further enhancing the heat shielding property of the laminated glass, it is preferred that the interlayer film include a heat reflective film in a region corresponding to the first region. From the viewpoint of further enhancing the heat shielding property of the laminated glass, it is preferred that the interlayer film include a heat reflective film in a region corresponding to the second region. From the viewpoint of transmitting light applied from the remote sensing device still more satisfactorily, and from the viewpoint of further enhancing the heat shielding property of the laminated glass, it is preferred that the interlayer film include a heat reflective film in a region corresponding to the first region and do not include a heat reflective film in a region corresponding to the second region. From the viewpoint of further enhancing the heat shielding property of the laminated glass, it is preferred that the interlayer film include a heat reflective film as an inner layer. From the viewpoint of further enhancing the heat shielding property of the laminated glass, it is preferred that the interlayer film include a three or more-layer structure, and the interlayer film include a heat reflective film as an inner layer. From the viewpoint of further enhancing the heat shielding property of the laminated glass, it is preferred that the interlayer film include a three-layer structure, and the interlayer film include a heat reflective film as an intermediate layer.

<Heat Reflective Film>

The heat reflective film is a film that reflects heat rays. The heat reflective film is not particularly limited as long as it has the property of reflecting heat rays. From the viewpoint of further enhancing the heat shielding property of the laminated glass, it is preferred that the heat reflective film be an infrared reflective film. It is preferred that the heat reflective film have the property of reflecting infrared rays.

Examples of the heat reflective film include a resin film with metal foil, a multilayer laminate film in which a metal layer and a dielectric layer are formed on a resin layer, a film containing graphite, a multilayer resin film, and a liquid crystal film. These films have the property of reflecting heat rays.

It is preferred that the heat reflective film be a resin film with metal foil, a film containing graphite, a multilayer resin film, or a liquid crystal film. These films are significantly excellent in the heat reflecting property. Therefore, by using these films, it is possible to obtain a laminated glass having still higher heat shielding property, and capable of keeping the high visible light transmittance for a still longer term.

It is more preferred that the heat reflective film be a multilayer resin film or a liquid crystal film. Since these films can transmit electromagnetic waves compared with a resin film with metal foil, an electronic device being used in a vehicle can be used without interference.

The resin film with metal foil includes a resin film, and a metal foil layered on the outer surface of the resin film. Examples of the material of the resin film include a polyethylene terephthalate resin, a polyethylene naphthalate resin, a polyvinyl acetal resin, an ethylene-vinyl acetate copolymer resin, an ethylene-acrylic acid copolymer resin, a polyurethane resin, a polyvinyl alcohol resin, a polyolefin resin, a polyvinyl chloride resin, and a polyimide resin. Examples of the material of the metal foil include aluminum, copper, silver, gold, palladium, and alloys containing these metals.

The multilayer laminate film in which a metal layer and a dielectric layer are formed on a resin layer is a multilayer laminate film in which any number of layers of the metal layer and the dielectric layer are alternately layered. In the multilayer laminate film in which a metal layer and a dielectric layer are formed on a resin layer, it is preferred that all of the metal layers and the dielectric layers be layered alternately, however, there may be a structural part in which a metal layer and a dielectric layer are not layered alternately as exemplified by metal layer/dielectric layer/metal layer/dielectric layer/metal layer/metal layer/dielectric layer/metal layer.

As the material of the resin layer (resin film) in the multilayer laminate film, those exemplified as the material of the resin film in the resin film with metal foil can be exemplified. Examples of the material of the resin layer (resin film) in the multilayer laminate film include polyethylene, polypropylene, polylactic acid, poly(4-methylpentene-1), polyvinylidene fluoride, cyclic polyolefin, polymethyl methacrylate, polyvinyl chloride, polyvinyl alcohol, polyamide such as nylon 6, 11, 12, 66 and the like, polystyrene, polycarbonate, polyethylene terephthalate, polyethylene naphthalate, polyester, polyphenylene sulfide, and polyether imide. As the material of the metal layer in the multilayer laminate film, those exemplified as the material of the metal foil in the resin film with metal foil can be exemplified. A coating layer of metal or a mixed oxide of metal can be given to the both faces or either face of the metal layer. Examples of the material of the coating layer include ZnO, $Al_2O_3$, $Ga_2O_3$, $InO_3$, MgO, Ti, NiCr and Cu.

Examples of the dielectric layer in the multilayer laminate film include indium oxide.

The multilayer resin film is a laminate film in which a plurality of resin films are layered. As the material of the multilayer resin film, those exemplified as the material of the resin layer (resin film) in the multilayer laminate film can be exemplified. The number of layered resin films in the multilayer resin film is 2 or more, and may be 3 or more, and may be 5 or more. The number of layered resin films in the multilayer resin film may be 1000 or less, may be 100 or less, or may be 50 or less.

The multilayer resin film may be a multilayer resin film in which any number of layers of two or more kinds of thermoplastic resin films having different optical properties (refractive index) are layered alternately or randomly. Such a multilayer resin film is so configured that a desired heat ray reflecting property is obtained.

As the liquid crystal film, a film in which any number of layers of cholesteric liquid crystal layers that reflect the light of any wavelength are layered can be recited. Such a liquid crystal film is so configured that desired heat ray reflecting property is obtained.

The laminate of the heat reflective film and the second lamination glass member may be a second lamination glass member with metal foil. In this case, the metal foil functions as the heat reflective film.

For excellent performance of reflecting heat rays, it is preferred that the heat reflective film have such a property that the infrared transmittance is 40% or less at at least one wavelength within the range of 800 nm to 2000 nm. The infrared transmittance of the heat reflective film used in the later-described example satisfies the aforementioned preferred requirement. At least one wavelength within the range of 800 nm to 2000 nm, the infrared transmittance is more preferably 30% or less, and further preferably 20% or less.

Transmittance at each wavelength within the wavelength range of 800 nm to 2000 nm of the heat reflective film is specifically measured in the following manner. A single heat reflective film is prepared. Spectral transmittance at each wavelength within the wavelength of 800 nm to 2000 nm of the heat reflective film is obtained by using a spectrophotometer ("U-4100" available from Hitachi High-Tech Corporation) in accordance with JIS R3106:1998.

From the viewpoint of effectively enhancing the heat shielding property of the laminated glass, the infrared reflectance at a wavelength of 800 nm to 1200 nm of the heat reflective film is preferably 20% or more, more preferably 22% or more, and further preferably 25% or more.

The infrared reflectance at a wavelength of 800 nm to 1200 nm of the heat reflective film is specifically measured in the following manner. Reflectance at each wavelength within the wavelength of 800 nm to 1200 nm of the heat reflective film is obtained by using a spectrophotometer ("U-4100" available from Hitachi High-Tech Corporation) in accordance with JIS R3106:1998. Of the values of reflectance at each wavelength, it is preferred that the lowest value of reflectance be the above lower limit or more.

From the viewpoint of effectively enhancing the transparency of the laminated glass, the visible light transmittance at a wavelength of 380 nm to 780 nm of the heat reflective film is preferably 20% or more, more preferably 50% or more, and further preferably 70% or more.

The visible light transmittance is measured at a wavelength ranging from 380 nm to 780 nm by using a spectrophotometer ("U-4100" available from Hitachi High-Tech Corporation) in accordance with JIS R3211:1998.

<Pigment and Heat Shielding Substance>

From the viewpoint of transmitting light applied from the remote sensing device more satisfactorily, and from the viewpoint of further enhancing the heat shielding property of the laminated glass, it is preferred that the interlayer film contain a pigment. From the viewpoint of transmitting light applied from the remote sensing device more satisfactorily, and from the viewpoint of further enhancing the heat shielding property of the laminated glass, it is preferred that the interlayer film contain a heat shielding substance. It is sometimes the case that the pigment corresponds to the heat shielding substance. From the viewpoint of transmitting light applied from the remote sensing device more satisfactorily, and from the viewpoint of further enhancing the heat shielding property of the laminated glass, it is preferred that the interlayer film contain a pigment and a heat shielding substance, contain two or more kinds of pigments, or contain two or more kinds of heat shielding substances. From the viewpoint of transmitting light applied from the remote sensing device still further satisfactorily, and from the viewpoint of still further enhancing the heat shielding property of the laminated glass, it is preferred that the interlayer film contain a pigment and a heat shielding substance, or contain two or more kinds of heat shielding substances. The interlayer film may contain a pigment and a heat shielding substance, may contain two or more kinds of pigments, or may contain two or more kinds of heat shielding substances.

The first layer may contain or need not contain a pigment. The second layer may contain or need not contain a pigment. The third layer may contain or need not contain a pigment. One kind of the pigment may be used alone, and two or more kinds thereof may be used in combination.

The first layer may contain a heat shielding substance, or need not contain a heat shielding substance. The second layer may contain a heat shielding substance, or need not contain a heat shielding substance. The third layer may contain a heat shielding substance, or need not contain a heat shielding substance. One kind of the heat shielding substance may be used alone, and two or more kinds thereof may be used in combination.

From the viewpoint of further enhancing the heat shielding property of the laminated glass, it is preferred that the interlayer film contain a pigment in a region corresponding to the first region. From the viewpoint of further enhancing the heat shielding property of the laminated glass, it is preferred that the interlayer film contain a heat shielding substance in a region corresponding to the first region. From the viewpoint of further enhancing the heat shielding property of the laminated glass, it is preferred that the interlayer film contain a pigment and a heat shielding substance, contain two or more kinds of pigments, or contain two or more kinds of heat shielding substances in a region corresponding to the first region. From the viewpoint of still further enhancing the heat shielding property of the laminated glass, it is preferred that the interlayer film contain a pigment and a heat shielding substance, or contain two or more kinds of heat shielding substances in a region corresponding to the first region. The interlayer film may contain a pigment and a heat shielding substance, may contain two or more kinds of pigments, or may contain two or more kinds of heat shielding substances in a region corresponding to the first region. The interlayer film may contain a pigment or need not contain a pigment in a region corresponding to the second region. The interlayer film may contain a heat shielding substance or need not contain a heat shielding substance in a region corresponding to the second region. It is preferred that the interlayer film do not contain a pigment and do not contain a heat shielding substance in a region corresponding to the second region.

The pigment may be an organic pigment or an inorganic pigment, and may be a mixture of an organic pigment and an inorganic pigment. The organic pigment may be an organic pigment having a metal atom, and may be an organic pigment not having a metal atom.

From the viewpoint of further enhancing the heat shielding property, it is preferred that the pigment include a heat shielding pigment, and it is preferred that the pigment be a heat shielding pigment. The heat shielding pigment is a pigment having heat shielding property. Therefore, the heat shielding pigment also corresponds to the heat shielding substance. The pigment may be heat shielding particles. From the viewpoint of imparting color tone, it is preferred that the pigment include a coloring pigment, and it is preferred that the pigment be a coloring pigment. The pigment may be a pigment that is a heat shielding pigment and a coloring pigment.

Examples of the organic pigment include an azo compound (azo pigment), and a condensed polycyclic compound (polycyclic pigment) and the like. Examples of the condensed polycyclic compound include cyclic cyanine compounds such as a phthalocyanine compound, a naphthalocyanine compound and an anthracyanine compound, a quinacridone compound, a pentaphene compound, a dioxazine compound, a perylene compound, and an indole compound and the like.

From the viewpoints of effectively enhancing the heat shielding property and maintaining the visible light transmittance at a higher level over a long period of time, it is preferred that the phthalocyanine compound contain vanadium atoms or copper atoms. The phthalocyanine compound preferably contains a vanadium atom, and also preferably contains a copper atom. It is more preferred that the phthalocyanine compound be at least one kind among phthalocyanine containing vanadium atoms or copper atoms and a derivative of phthalocyanine containing vanadium atoms or copper atoms. From the viewpoint of still further enhancing the heat shielding property of the interlayer film and the laminated glass, it is preferred that the phthalocyanine compound have a structural unit in which an oxygen atom is bonded to a vanadium atom.

Examples of the quinacridone compound include quinacridone and derivatives of quinacridone. The quinacridone compound has a quinacridone skeleton.

Examples of the pentaphene compound include pentaphene and derivatives of pentaphene. The pentaphene compound has a pentaphene skeleton.

Examples of the dioxazine compound include dioxazine and derivatives of dioxazine. The dioxazine compound has a dioxazine skeleton.

Examples of the perylene compound include perylene and derivatives of perylene. The perylene compound has a perylene skeleton.

Examples of the indole compound include indole and derivatives of indole. The indole compound has an indole skeleton.

Examples of the inorganic pigment include carbon black, graphene, iron oxide particles, zinc oxide particles, titanium oxide particles, aluminum-doped tin oxide particles, indium-doped tin oxide particles, antimony-doped tin oxide particles (ATO particles), gallium-doped zinc oxide particles (GZO particles), indium-doped zinc oxide particles (IZO particles), aluminum-doped zinc oxide particles (AZO particles), niobium-doped titanium oxide particles, sodium-doped tungsten oxide particles, cesium-doped tungsten oxide particles (CWO particles), thallium-doped tungsten oxide particles, rubidium-doped tungsten oxide particles, tin-doped indium oxide particles (ITO particles), tin-doped zinc oxide particles and silicon-doped zinc oxide particles, lanthanum hexaboride (LaB$_6$) particles, and the like.

Examples of the heat shielding substance include cyclic cyanine compounds such as a phthalocyanine compound, a naphthalocyanine compound, and an anthracyanine compound, and heat shielding particles and the like.

Examples of the cyclic cyanine compounds include phthalocyanine, a derivative of phthalocyanine, naphthalocyanine, a derivative of naphthalocyanine, anthracyanine, and a derivative of anthracyanine, and the like. It is preferred that each of the phthalocyanine compound and the derivative of phthalocyanine have a phthalocyanine skeleton. It is preferred that each of the naphthalocyanine compound and the derivative of naphthalocyanine have a naphthalocyanine skeleton. It is preferred that each of the anthracyanine compound and the derivative of anthracyanine have an anthracyanine skeleton.

Examples of the heat shielding particles include inorganic oxide particles and carbon black and the like.

Specific examples of the heat shielding particles include carbon black, metal oxide particles such as aluminum-doped tin oxide particles, indium-doped tin oxide particles, antimony-doped tin oxide particles (ATO particles), gallium-doped zinc oxide particles (GZO particles), indium-doped zinc oxide particles (IZO particles), aluminum-doped zinc oxide particles (AZO particles), niobium-doped titanium oxide particles, sodium-doped tungsten oxide particles, cesium-doped tungsten oxide particles (CWO particles), thallium-doped tungsten oxide particles, rubidium-doped tungsten oxide particles, tin-doped indium oxide particles (ITO particles), tin-doped zinc oxide particles and silicon-doped zinc oxide particles, lanthanum hexaboride (LaB$_6$) particles, and the like.

It is preferred that the interlayer film contain a cyclic cyanine compound, inorganic oxide particles, or carbon black in a region corresponding to the first region. In this case, it is possible to further enhance the heat shielding property.

From the viewpoint of further enhancing the heat shielding property, it is preferred that the inorganic oxide particles include ATO particles, GZO particles, IZO particles, ITO particles, sodium-doped tungsten oxide particles, CWO particles, thallium-doped tungsten oxide particles, or rubidium-doped tungsten oxide particles. From the viewpoint of further enhancing the heat shielding property, it is more preferred that the inorganic oxide particles include ATO particles, ITO particles or CWO particles, and it is further preferred that the inorganic oxide particles include ITO particles or CWO particles. From the viewpoint of further enhancing the heat shielding property, it is more preferred that the inorganic oxide particles be ATO particles, ITO particles or CWO particles, and it is further preferred that the inorganic oxide particles be ITO particles or CWO particles.

From the viewpoint of still further enhancing the heat shielding property, it is preferred that the CWO particles be cesium-doped tungsten oxide particles represented by the formula: $Cs_{0.33}WO_3$.

From the viewpoint of transmitting light applied from the remote sensing device more satisfactorily, and from the viewpoint of further enhancing the heat shielding property of the laminated glass, it is preferred that the interlayer film contain at least two kinds selected from the group consisting of a cyclic cyanine compound, inorganic oxide particles and carbon black. From the viewpoint of further enhancing the heat shielding property of the laminated glass, it is preferred that the interlayer film contain at least two kinds selected from the group consisting of a cyclic cyanine compound, inorganic oxide particles and carbon black in a region corresponding to the first region.

From the viewpoint of transmitting light applied from the remote sensing device more satisfactorily, and from the viewpoint of further enhancing the heat shielding property of the laminated glass, it is preferred that the interlayer film contain at least two kinds selected from the group consisting of a cyclic cyanine compound, ITO particles, CWO particles and carbon black. From the viewpoint of further enhancing the heat shielding property of the laminated glass, it is preferred that the interlayer film contain at least two kinds selected from the group consisting of a cyclic cyanine compound, ITO particles, CWO particles and carbon black in a region corresponding to the first region.

From the viewpoint of transmitting light applied from the remote sensing device more satisfactorily, and from the viewpoint of further enhancing the heat shielding property of the laminated glass, it is preferred that the interlayer film contain at least two kinds selected from the group consisting of ITO particles, CWO particles and carbon black. From the viewpoint of further enhancing the heat shielding property of the laminated glass, it is preferred that the interlayer film contain at least two kinds selected from the group consisting of ITO particles, CWO particles and carbon black in a region corresponding to the first region.

From the viewpoint of transmitting light applied from the remote sensing device more satisfactorily, and from the viewpoint of further enhancing the heat shielding property of the laminated glass, it is preferred that the interlayer film contain ITO particles and CWO particles. From the viewpoint of further enhancing the heat shielding property of the laminated glass, it is preferred that the interlayer film contain ITO particles and CWO particles in a region corresponding to the first region.

The average particle diameter of the heat shielding particles or the inorganic pigment is preferably 0.01 μm or more, more preferably 0.02 μm or more, and is preferably 0.1 μm or less, more preferably 0.05 μm or less. When the average particle diameter is the above lower limit or more, the heat shielding property is sufficiently enhanced. When the average particle diameter is the above upper limit or less, the dispersibility of heat shielding particles or the inorganic pigment is enhanced.

The "average particle diameter" refers to the volume average particle diameter. The average particle diameter can be measured using a particle size distribution measuring apparatus ("UPA-EX150" available from NIKKISO CO., LTD.), or the like.

In a region corresponding to the first region, in 100% by weight of a layer containing the pigment (first layer, second layer, or third layer), the content of the pigment is preferably 0.0001% by weight or more, more preferably 0.001% by weight or more, further preferably 0.01% by weight or more, especially preferably 0.1% by weight or more. In a region corresponding to the first region, in 100% by weight of a layer containing the pigment (first layer, second layer, or third layer), the content of the pigment is preferably 5% by weight or less, more preferably 1% by weight or less, further preferably 0.5% by weight or less. When the content of the pigment is the above lower limit or more and the above upper limit or less, the heat shielding property is sufficiently enhanced and the visible light transmittance is sufficiently enhanced.

In a region corresponding to the first region, in 100% by weight of a layer containing the heat shielding substance (first layer, second layer, or third layer), the content of the heat shielding substance is preferably 0.0001% by weight or more, more preferably 0.001% by weight or more, further preferably 0.01% by weight or more, especially preferably 0.1% by weight or more. In a region corresponding to the first region, in 100% by weight of a layer containing the heat shielding substance (first layer, second layer, or third layer), the content of the heat shielding substance is preferably 5% by weight or less, more preferably 1% by weight or less, further preferably 0.5% by weight or less. When the content of the heat shielding substance is the above lower limit or more and the above upper limit or less, the heat shielding property is sufficiently enhanced and the visible light transmittance is sufficiently enhanced.

<Thermoplastic Resin>

It is preferred that the interlayer film contain a resin (hereinafter, sometimes described as a resin (0)). It is preferred that the interlayer film contain resin (0) in a region corresponding to the first region and in a region corresponding to the second region. It is preferred that the interlayer film contain a thermoplastic resin (hereinafter, sometimes described as a thermoplastic resin (0)). It is preferred that the interlayer film contain the thermoplastic resin (0) in a region corresponding to the first region and in a region corresponding to the second region. It is preferred that the interlayer film contain a polyvinyl acetal resin (hereinafter, sometimes described as a polyvinyl acetal resin (0)) as the thermoplastic resin (0). It is preferred that the first layer contain a resin (hereinafter, sometimes described as a resin (1)). It is preferred that the first layer contain the resin (1) in a region corresponding to the first region and in a region corresponding to the second region. It is preferred that the first layer contain a thermoplastic resin (hereinafter, sometimes described as a thermoplastic resin (1)). It is preferred that the first layer contain the thermoplastic resin (1) in a region corresponding to the first region and in a region corresponding to the second region. It is preferred that the first layer contain a polyvinyl acetal resin (hereinafter, sometimes described as a polyvinyl acetal resin (1)) as the thermoplastic resin (1). It is preferred that the second layer contain a resin (hereinafter, sometimes described as a resin (2)). It is preferred that the second layer contain the resin (2) in a region corresponding to the first region and in a region corresponding to the second region. It is preferred that the second layer contain a thermoplastic resin (hereinafter, sometimes described as a thermoplastic resin (2)). It is preferred that the second layer contain the thermoplastic resin (2) in a region corresponding to the first region and in a region corresponding to the second region. It is preferred that the second layer contain a polyvinyl acetal resin (hereinafter, sometimes described as a polyvinyl acetal resin (2)) as the thermoplastic resin (2). It is preferred that the third layer contain a resin (hereinafter, sometimes described as a resin (3)). It is preferred that the third layer contain the resin (3) in a region corresponding to the first region and in a region corresponding to the second region. It is preferred that the third layer contain a thermoplastic resin (hereinafter, sometimes described as a thermoplastic resin (3)). It is preferred that the third layer contain the thermoplastic resin (3) in a region corresponding to the first region and in a region corresponding to the second region. It is preferred that the third layer contain a polyvinyl acetal resin (hereinafter, sometimes described as a polyvinyl acetal resin (3)) as the thermoplastic resin (3). The resin (1), the resin (2), and the resin (3) may be the same as or different from one another. For still higher sound insulating property, it is preferred that the resin (1) be different from the resin (2) and the resin (3). The thermoplastic resin (1), the thermoplastic resin (2), and the thermoplastic resin (3) may be the same or different from one another. For still higher sound insulating property, it is preferred that the thermoplastic resin (1) be different from the thermoplastic resin (2) and the thermoplastic resin (3). Each of the polyvinyl acetal resin (1), the polyvinyl acetal resin (2), and the polyvinyl acetal resin (3) may be the same or different from one another. For still higher sound insulating property, it is preferred that the polyvinyl acetal resin (1) be different from the polyvinyl acetal resin (2) and the polyvinyl acetal resin (3). One kind of each of the thermoplastic resin (0), the thermoplastic resin (1), the thermoplastic resin (2), and the thermoplastic resin (3) may be used alone and two or more kinds thereof may be used in combination. One kind of each of the polyvinyl acetal resin (0), the polyvinyl acetal resin (1), the polyvinyl acetal resin (2), and the polyvinyl acetal resin (3) may be used alone and two or more kinds thereof may be used in combination.

Examples of the thermoplastic resin include a polyvinyl acetal resin, an ethylene-vinyl acetate copolymer resin, an ethylene-acrylic acid copolymer resin, a polyurethane resin, an ionomer resin, a polyvinyl alcohol resin, and the like. Thermoplastic resins other than these may be used.

For example, the polyvinyl acetal resin can be produced by acetalizing polyvinyl alcohol (PVA) with an aldehyde. It is preferred that the polyvinyl acetal resin be an acetalized product of polyvinyl alcohol. The polyvinyl alcohol can be obtained, for example, by saponifying polyvinyl acetate. The saponification degree of the polyvinyl alcohol generally lies within the range of 70% by mole to 99.9% by mole.

The average polymerization degree of the polyvinyl alcohol (PVA) is preferably 200 or more, more preferably 500 or more, even more preferably 1500 or more, further preferably 1600 or more, especially preferably 2600 or more, most preferably 2700 or more and is preferably 5000 or less, more preferably 4000 or less, further preferably 3500 or less. When the average polymerization degree is the above lower limit or more, the penetration resistance of the laminated glass is further enhanced. When the average polymerization degree is the above upper limit or less, formation of an interlayer film is facilitated.

The average polymerization degree of the polyvinyl alcohol is determined by a method in accordance with JIS K6726 "Testing methods for polyvinyl alcohol".

The number of carbon atoms of the acetal group contained in the polyvinyl acetal resin is not particularly limited. The number of carbon atoms of the acetal group in the polyvinyl acetal resin is preferably 3 to 5, more preferably 3 or 4. When the number of carbon atoms of the acetal group in the polyvinyl acetal resin is 3 or more, the glass transition temperature of the interlayer film is sufficiently lowered. The number of carbon atoms of the acetal group in the polyvinyl acetal resin may be 4 or 5.

The aldehyde used at the time of producing the polyvinyl acetal resin is not particularly limited. In general, an aldehyde with 1 to 10 carbon atoms is suitably used. Examples of the aldehyde with 1 to 10 carbon atoms include propionaldehyde, n-butyraldehyde, isobutyraldehyde, n-valeraldehyde, 2-ethylbutyraldehyde, n-hexylaldehyde, n-octylaldehyde, n-nonylaldehyde, n-decylaldehyde, formaldehyde, acetaldehyde, benzaldehyde, and the like. The aldehyde is preferably propionaldehyde, n-butyraldehyde, isobutyraldehyde, n-hexylaldehyde, or n-valeraldehyde, more preferably propionaldehyde, n-butyraldehyde or isobutyraldehyde, and further preferably n-butyraldehyde. One kind of the aldehyde may be used alone, and two or more kinds thereof may be used in combination.

The content of the hydroxyl group (the amount of hydroxyl groups) of the polyvinyl acetal resin (0) is preferably 15% by mole or more and more preferably 18% by mole or more and is preferably 40% by mole or less and more preferably 35% by mole or less. When the content of the hydroxyl group is the above lower limit or more, the adhesive force of the interlayer film is further enhanced. Moreover, when the content of the hydroxyl group is the above upper limit or less, the flexibility of the interlayer film is enhanced and the handling of the interlayer film is facilitated.

The content of the hydroxyl group (the amount of hydroxyl groups) of the polyvinyl acetal resin (1) is preferably 17% by mole or more, more preferably 20% by mole or more, and further preferably 22% by mole or more. The content of the hydroxyl group (the amount of hydroxyl groups) of the polyvinyl acetal resin (1) is preferably 30% by mole or less, more preferably 28% by mole or less, still more preferably 27% by mole or less, further preferably 25% by mole or less, especially preferably less than 25% by mole, most preferably 24% by mole or less. When the content of the hydroxyl group is the above lower limit or more, the mechanical strength of the interlayer film is further enhanced. In particular, when the content of the hydroxyl group of the polyvinyl acetal resin (1) is 20% by mole or more, the resin is high in reaction efficiency and is excellent in productivity, and moreover, when being 28% by mole or less, the sound insulating property of laminated glass is further enhanced. Moreover, when the content of the hydroxyl group is the above-described upper limit or less or less than the above-described upper limit, the flexibility of the interlayer film is enhanced and the handling of the interlayer film is facilitated.

Each of the contents of the hydroxyl group of the polyvinyl acetal resin (2) and the polyvinyl acetal resin (3) is preferably 25% by mole or more, more preferably 28% by mole or more, still more preferably 30% by mole or more, further preferably more than 31% by mole, still further preferably 31.5% by mole or more, especially preferably 32% by mole or more, and most preferably 33% by mole or more. Each of the contents of the hydroxyl group of the polyvinyl acetal resin (2) and the polyvinyl acetal resin (3) is preferably 38% by mole or less, more preferably 37% by mole or less, further preferably 36.5% by mole or less, especially preferably 36% by mole or less. When the content of the hydroxyl group is the above-described lower limit or more or more than the above-described lower limit, the adhesive force of the interlayer film is further enhanced. Moreover, when the content of the hydroxyl group is the above upper limit or less, the flexibility of the interlayer film is enhanced and the handling of the interlayer film is facilitated.

From the viewpoint of further enhancing the sound insulating property, it is preferred that the content of the hydroxyl group of the polyvinyl acetal resin (1) be lower than the content of the hydroxyl group of the polyvinyl acetal resin (2). From the viewpoint of further enhancing the sound insulating property, it is preferred that the content of the hydroxyl group of the polyvinyl acetal resin (1) be lower than the content of the hydroxyl group of the polyvinyl acetal resin (3). From the viewpoint of still further enhancing the sound insulating property, the absolute value of difference between the content of the hydroxyl group of the polyvinyl acetal resin (1) and the content of the hydroxyl group of the polyvinyl acetal resin (2) is preferably 1% by mole or more, more preferably 5% by mole or more, further preferably 9% by mole or more, especially preferably 10% by mole or more, most preferably 12% by mole or more. From the viewpoint of still further enhancing the sound insulating property, the absolute value of difference between the content of the hydroxyl group of the polyvinyl acetal resin (1) and the content of the hydroxyl group of the polyvinyl acetal resin (3) is preferably 1% by mole or more, more preferably 5% by mole or more, further preferably 9% by mole or more, especially preferably 10% by mole or more, most preferably 12% by mole or more. An absolute value of difference between the content of the hydroxyl group of the polyvinyl acetal resin (1) and the content of the hydroxyl group of the polyvinyl acetal resin (2) is preferably 20% by mole or less. An absolute value of difference between the content of the hydroxyl group of the polyvinyl acetal resin (1) and the content of the hydroxyl group of the polyvinyl acetal resin (3) is preferably 20% by mole or less.

The content of the hydroxyl group of the polyvinyl acetal resin is a mole fraction, represented in percentage, obtained by dividing the amount of ethylene groups to which the hydroxyl group is bonded by the total amount of ethylene groups in the main chain. For example, the amount of ethylene groups to which the hydroxyl group is bonded can be measured in accordance with JIS K6728 "Testing methods for polyvinyl butyral".

The acetylation degree (the amount of acetyl groups) of the polyvinyl acetal resin (0) is preferably 0.1% by mole or more, more preferably 0.3% by mole or more, further preferably 0.5% by mole or more and is preferably 30% by mole or less, more preferably 25% by mole or less, and further preferably 20% by mole or less. When the acetylation degree is the above lower limit or more, the compatibility between the polyvinyl acetal resin and a plasticizer is enhanced. When the acetylation degree is the above upper limit or less, the moisture resistance of the interlayer film and laminated glass is enhanced.

The acetylation degree (the amount of acetyl groups) of the polyvinyl acetal resin (1) is preferably 0.01% by mole or more, more preferably 0.1% by mole or more, even more preferably 7% by mole or more, further preferably 9% by mole or more and is preferably 30% by mole or less, more preferably 25% by mole or less, further preferably 24% by mole or less, especially preferably 20% by mole or less. When the acetylation degree is the above lower limit or more, the compatibility between the polyvinyl acetal resin and a plasticizer is enhanced. When the acetylation degree is the above upper limit or less, the moisture resistance of the interlayer film and laminated glass is enhanced. In particular, when the acetylation degree of the polyvinyl acetal resin (1) is 0.1% by mole or more and is 25% by mole or less, the resulting laminated glass is excellent in penetration resistance.

The acetylation degree of each of the polyvinyl acetal resin (2) and the polyvinyl acetal resin (3) is preferably 0.01% by mole or more, more preferably 0.5% by mole or more and is preferably 10% by mole or less, more preferably 2% by mole or less. When the acetylation degree is the above lower limit or more, the compatibility between the polyvinyl acetal resin and a plasticizer is enhanced. When the acetylation degree is the above upper limit or less, the moisture resistance of the interlayer film and laminated glass is enhanced.

The acetylation degree is a mole fraction, represented in percentage, obtained by dividing the amount of ethylene groups to which the acetyl group is bonded by the total amount of ethylene groups in the main chain. For example, the amount of ethylene groups to which the acetyl group is bonded can be determined in accordance with JIS K6728 "Testing methods for polyvinyl butyral".

The acetalization degree of the polyvinyl acetal resin (0) (the butyralization degree in the case of a polyvinyl butyral resin) is preferably 60% by mole or more, more preferably 63% by mole or more and is preferably 85% by mole or less, more preferably 75% by mole or less, further preferably 70% by mole or less. When the acetalization degree is the above lower limit or more, the compatibility between the polyvinyl acetal resin and a plasticizer is enhanced. When the acetalization degree is the above upper limit or less, the reaction time required for producing the polyvinyl acetal resin is shortened.

The acetalization degree of the polyvinyl acetal resin (1) (the butyralization degree in the case of a polyvinyl butyral resin) is preferably 47% by mole or more, more preferably 60% by mole or more, and is preferably 85% by mole or less, more preferably 80% by mole or less, further preferably 75% by mole or less. When the acetalization degree is the above lower limit or more, the compatibility between the polyvinyl acetal resin and a plasticizer is enhanced. When the acetalization degree is the above upper limit or less, the reaction time required for producing the polyvinyl acetal resin is shortened.

The acetalization degree of each of the polyvinyl acetal resin (2) and the polyvinyl acetal resin (3) (the butyralization degree in the case of a polyvinyl butyral resin) is preferably 55% by mole or more, more preferably 60% by mole or more and is preferably 75% by mole or less, more preferably 71% by mole or less. When the acetalization degree is the above lower limit or more, the compatibility between the polyvinyl acetal resin and a plasticizer is enhanced. When the acetalization degree is the above upper limit or less, the reaction time required for producing the polyvinyl acetal resin is shortened.

The acetalization degree is determined in the following manner. From the total amount of the ethylene group in the main chain, the amount of the ethylene group to which the hydroxyl group is bonded and the amount of the ethylene group to which the acetyl group is bonded are subtracted. The obtained value is divided by the total amount of the ethylene group in the main chain to obtain a mole fraction. The mole fraction represented in percentage is the acetalization degree.

In this connection, it is preferred that the content of the hydroxyl group (the amount of hydroxyl groups), the acetalization degree (the butyralization degree) and the acetylation degree be calculated from the results determined by a method conforming to JIS K6728 "Testing methods for polyvinyl butyral". In this context, a method in accordance with ASTM D1396-92 may be used. When the polyvinyl acetal resin is a polyvinyl butyral resin, the content of the hydroxyl group (the amount of hydroxyl groups), the acetalization degree (the butyralization degree) and the acetylation degree can be calculated from the results measured by a method conforming to JIS K6728 "Testing methods for polyvinyl butyral".

In 100% by weight of the thermoplastic resin contained in the interlayer film, the content of the polyvinyl acetal resin is preferably 10% by weight or more, more preferably 30% by weight or more, still more preferably 50% by weight or more, further preferably 70% by weight or more, especially preferably 80% by weight or more, most preferably 90% by weight or more. In 100% by weight of the thermoplastic resin contained in the interlayer film, the content of the polyvinyl acetal resin may be 100% by weight or less. It is preferred that the main ingredient (50% by weight or more) of the thermoplastic resin of the interlayer film be a polyvinyl acetal resin.

In 100% by weight of the thermoplastic resin contained in the first layer, the content of the polyvinyl acetal resin is preferably 10% by weight or more, more preferably 30% by weight or more, still more preferably 50% by weight or more, further preferably 70% by weight or more, especially preferably 80% by weight or more, most preferably 90% by weight or more. In 100% by weight of the thermoplastic resin contained in the first layer, the content of the polyvinyl acetal resin may be 100% by weight or less. It is preferred that the main ingredient (50% by weight or more) of the thermoplastic resin of the first layer be a polyvinyl acetal resin.

In 100% by weight of the thermoplastic resin contained in the second layer, the content of the polyvinyl acetal resin is preferably 10% by weight or more, more preferably 30% by weight or more, still more preferably 50% by weight or more, further preferably 70% by weight or more, especially preferably 80% by weight or more, most preferably 90% by weight or more. In 100% by weight of the thermoplastic resin contained in the second layer, the content of the polyvinyl acetal resin may be 100% by weight or less. It is preferred that the main ingredient (50% by weight or more) of the thermoplastic resin of the second layer be a polyvinyl acetal resin.

In 100% by weight of the thermoplastic resin contained in the third layer, the content of the polyvinyl acetal resin is preferably 10% by weight or more, more preferably 30% by weight or more, still more preferably 50% by weight or more, further preferably 70% by weight or more, especially preferably 80% by weight or more, most preferably 90% by weight or more. In 100% by weight of the thermoplastic resin contained in the third layer, the content of the polyvinyl acetal resin may be 100% by weight or less. It is preferred that the main ingredient (50% by weight or more) of the thermoplastic resin of the third layer be a polyvinyl acetal resin.

<Plasticizer>

From the viewpoint of further enhancing the adhesive strength of an interlayer film, it is preferred that the interlayer film contain a plasticizer (hereinafter, sometimes described as a plasticizer (0)). It is preferred that the interlayer film contain the plasticizer (0) in a region corresponding to the first region and in a region corresponding to the second region. It is preferred that the first layer contain a plasticizer (hereinafter, sometimes described as a plasticizer (1)). It is preferred that the first layer contain the plasticizer (1) in a region corresponding to the first region and in a region corresponding to the second region. It is preferred that the second layer contain a plasticizer (hereinafter, sometimes described as a plasticizer (2)). It is preferred that the second layer contain the plasticizer (2) in a region corresponding to the first region and in a region corresponding to the second region. It is preferred that the third layer contain a plasticizer (hereinafter, sometimes described as a plasticizer (3)). It is preferred that the third layer contain the plasticizer (3) in a region corresponding to the first region and in a region corresponding to the second region. When the thermoplastic resin contained in the interlayer film is a polyvinyl acetal resin, it is especially preferred that the interlayer film (the respective layers) contain a plasticizer. It is preferred that a layer containing a polyvinyl acetal resin contain a plasticizer.

The plasticizer is not particularly limited. As the plasticizer, a conventionally known plasticizer can be used. One kind of the plasticizer may be used alone and two or more kinds thereof may be used in combination.

Examples of the plasticizer include organic ester plasticizers such as a monobasic organic acid ester and a polybasic organic acid ester, organic phosphate plasticizers and organic phosphite plasticizers, and the like. It is preferred that the plasticizer be an organic ester plasticizer. It is preferred that the plasticizer be a liquid plasticizer.

Examples of the monobasic organic acid ester include a glycol ester obtained by the reaction of a glycol with a monobasic organic acid, and the like. Examples of the glycol include triethylene glycol, tetraethylene glycol, tripropylene glycol, and the like. Examples of the monobasic organic acid include butyric acid, isobutyric acid, caproic acid, 2-ethylbutyric acid, heptanoic acid, n-octylic acid, 2-ethylhexanoic acid, n-nonylic acid, decylic acid, benzoic acid and the like.

Examples of the polybasic organic acid ester include an ester compound of a polybasic organic acid and an alcohol having a linear or branched structure of 4 to 8 carbon atoms, and the like. Examples of the polybasic organic acid include adipic acid, sebacic acid, azelaic acid, and the like.

Examples of the organic ester plasticizer include triethylene glycol di-2-ethylpropanoate, triethylene glycol di-2-ethylbutyrate, triethylene glycol di-2-ethylhexanoate, triethylene glycol dicaprylate, triethylene glycol di-n-octanoate, triethylene glycol di-n-heptanoate, tetraethylene glycol di-n-heptanoate, dibutyl sebacate, dioctyl azelate, dibutyl carbitol adipate, ethylene glycol di-2-ethylbutyrate, 1,3-propylene glycol di-2-ethylbutyrate, 1,4-butylene glycol di-2-ethylbutyrate, diethylene glycol di-2-ethylbutyrate, diethylene glycol di-2-ethylhexanoate, dipropylene glycol di-2-ethylbutyrate, triethylene glycol di-2-ethylpentanoate, tetraethylene glycol di-2-ethylbutyrate, diethylene glycol dicaprylate, diethylene glycol dibenzoate, dipropylene glycol dibenzoate, dihexyl adipate, dioctyl adipate, hexyl cyclohexyl adipate, a mixture of heptyl adipate and nonyl adipate, diisononyl adipate, diisodecyl adipate, heptyl nonyl adipate, dibutyl sebacate, oil-modified sebacic alkyds, a mixture of a phosphoric acid ester and an adipic acid ester, and the like. As the organic ester plasticizer, other organic ester plasticizer than those recited above may be used. As the adipic acid ester, adipic acid esters other than the aforementioned adipic acid esters may be used.

Examples of the organic phosphate plasticizer include tributoxyethyl phosphate, isodecyl phenyl phosphate, triisopropyl phosphate, and the like.

It is preferred that the plasticizer be a diester plasticizer represented by the following formula (1).

[Chemical 1]

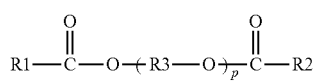

(1)

In the formula (1), R1 and R2 each represent an organic group with 2 to 10 carbon atoms, R3 represents an ethylene group, an isopropylene group, or an n-propylene group, and p represents an integer of 3 to 10. R1 and R2 in the formula (1) each are preferably an organic group with 5 to 10 carbon atoms, and more preferably an organic group with 6 to 10 carbon atoms.

It is preferred that the plasticizer include triethylene glycol di-2-ethylhexanoate (3GO), triethylene glycol di-2-ethylbutyrate (3GH) or triethylene glycol di-2-ethylpropanoate. It is more preferred that the plasticizer include triethylene glycol di-2-ethylhexanoate (3GO) or triethylene glycol di-2-ethylbutyrate (3GH), and it is further preferred that the plasticizer include triethylene glycol di-2-ethylhexanoate (3GO).

In the interlayer film, the content of the plasticizer (0) per 100 parts by weight of the thermoplastic resin (0) is defined as content (0). The content (0) is preferably 5 parts by weight or more, more preferably 25 parts by weight or more, further preferably 30 parts by weight or more, and is preferably 100 parts by weight or less, more preferably 60 parts by weight or less, further preferably 50 parts by weight or less. When the content (0) is the above lower limit or more, the penetration resistance of the laminated glass is further enhanced. When the content (0) is the above upper limit or less, the transparency of the interlayer film is further enhanced.

In the first layer, the content of the plasticizer (1) relative to 100 parts by weight of the thermoplastic resin (1) is referred to as content (1). The content (1) is preferably 50 parts by weight or more, more preferably 55 parts by weight or more, further preferably 60 parts by weight or more. The content (1) is preferably 100 parts by weight or less, more preferably 90 parts by weight or less, further preferably 85 parts by weight or less, especially preferably 80 parts by weight or less. When the content (1) is the above lower limit or more, the flexibility of the interlayer film is enhanced and the handling of the interlayer film is facilitated. When the content (1) is the above upper limit or less, the penetration resistance of laminated glass is further enhanced.

In the second layer, the content of the plasticizer (2) per 100 parts by weight of the thermoplastic resin (2) is defined as a content (2). In the third layer, the content of the plasticizer (3) relative to 100 parts by weight of the thermoplastic resin (3) is defined as content (3). Each of the content (2) and the content (3) is preferably 5 parts by weight or more, more preferably 10 parts by weight or more, still more preferably 15 parts by weight or more, further preferably 20 parts by weight or more, especially preferably 24 parts by weight or more, and most preferably parts by weight or more. Each of the content (2) and the content (3) is preferably 45 parts by weight or less, more preferably 40 parts by weight or less, further preferably 35 parts by weight or less, especially preferably 32 parts by weight or less, and most preferably 30 parts by weight or less. When the content (2) and the content (3) are the above lower limit or more, the flexibility of the interlayer film is enhanced and the handling of the interlayer film is facilitated. When the content (2) and the content (3) are the above upper limit or less, the penetration resistance of the laminated glass is further enhanced.

For the purpose of enhancing the sound insulating property of the laminated glass, it is preferred that the content (1) be larger than the content (2) and it is preferred that the content (1) be larger than the content (3).

From the viewpoint of further enhancing the sound insulating property of the laminated glass, each of the absolute value of difference between the content (2) and the content (1) and the absolute value of difference between the content (3) and the content (1) is preferably 10 parts by weight or more, more preferably 15 parts by weight or more, and further preferably 20 parts by weight or more. Each of the absolute value of difference between the content (2) and the content (1) and the absolute value of difference between the content (3) and the content (1) is preferably 80 parts by weight or less, more preferably 75 parts by weight or less, further preferably 70 parts by weight or less.

<Metal Salt>

It is preferred that the interlayer film contain at least one kind of metal salt (hereinafter, sometimes described as Metal salt M) of alkali metal salts and alkali earth metal salts. It is preferred that the interlayer film contain Metal salt M in a region corresponding to the first region and in a region corresponding to the second region. It is preferred that the first layer contain the Metal salt M. It is preferred that the first layer contain the Metal salt M in a region corresponding to the first region and in a region corresponding to the second region. It is preferred that the second layer contain the Metal salt M. It is preferred that the second layer contain the Metal salt M in a region corresponding to the first region and in a region corresponding to the second region. It is preferred that the third layer contain the Metal salt M. It is preferred that the third layer contain the Metal salt M in a region corresponding to the first region and in a region corresponding to the second region. The alkali earth metal means six metals of Be, Mg, Ca, Sr, Ba, and Ra. By the use of the Metal salt M, controlling the adhesivity between the interlayer film and a lamination glass member or the adhesivity between respective layers in the interlayer film is facilitated. One kind of the Metal salt M may be used alone, and two or more kinds thereof may be used in combination.

It is preferred that the Metal salt M contain at least one kind of metal selected from the group consisting of Li, Na, K, Rb, Cs, Mg, Ca, Sr and Ba. It is preferred that the metal salt included in the interlayer film contain at least one kind of metal among K and Mg.

As the metal salt M, an alkali metal salt of an organic acid having 2 to 16 carbon atoms, and an alkali earth metal salt of an organic acid having 2 to 16 carbon atoms can be used. The metal salt M may include a magnesium carboxylate having 2 to 16 carbon atoms, or a potassium carboxylate having 2 to 16 carbon atoms.

Examples of the magnesium carboxylate with 2 to 16 carbon atoms and the potassium carboxylate with 2 to 16 carbon atoms include magnesium acetate, potassium acetate, magnesium propionate, potassium propionate, magnesium 2-ethylbutyrate, potassium 2-ethylbutanoate, magnesium 2-ethylhexanoate, potassium 2-ethylhexanoate, and the like.

The total of the contents of Mg and K in the interlayer film containing the Metal salt M or a layer containing the Metal salt M (a first layer, a second layer, or a third layer) is preferably 5 ppm or more, more preferably 10 ppm or more, further preferably 20 ppm or more, and is preferably 300 ppm or less, more preferably 250 ppm or less, further preferably 200 ppm or less. When the total of the contents of Mg and K is the above lower limit or more and the above upper limit or less, the adhesivity between the interlayer film and a lamination glass member such as a glass plate or the adhesivity between respective layers in the interlayer film can be further well controlled.

<Ultraviolet Ray Screening Agent>

It is preferred that the interlayer film contain an ultraviolet ray screening agent. It is preferred that the interlayer film contain an ultraviolet ray screening agent in a region corresponding to the first region and in a region corresponding to the second region. It is preferred that the first layer contain an ultraviolet ray screening agent. It is preferred that the first layer contain an ultraviolet ray screening agent in a region corresponding to the first region and in a region corresponding to the second region. It is preferred that the second layer contain an ultraviolet ray screening agent. It is preferred that the second layer contain an ultraviolet ray screening agent in a region corresponding to the first region and in a region corresponding to the second region. It is preferred that the third layer contain an ultraviolet ray screening agent. It is preferred that the third layer contain an ultraviolet ray screening agent in a region corresponding to the first region and in a region corresponding to the second region. By the use of an ultraviolet ray screening agent, the visible light transmittance becomes still less likely to decrease even when the interlayer film and the laminated glass are used for a long period. One kind of the ultraviolet ray screening agent may be used alone, and two or more kinds thereof may be used in combination.

Examples of the ultraviolet ray screening agent include an ultraviolet ray absorber. It is preferred that the ultraviolet ray screening agent be an ultraviolet ray absorber.

Examples of the ultraviolet ray screening agent include an ultraviolet ray screening agent containing a metal atom, an ultraviolet ray screening agent containing a metal oxide, an ultraviolet ray screening agent having a benzotriazole structure (a benzotriazole compound), an ultraviolet ray screening agent having a benzophenone structure (a benzophenone compound), an ultraviolet ray screening agent having a triazine structure (a triazine compound), an ultraviolet ray screening agent having a malonic acid ester structure (a malonic acid ester compound), an ultraviolet ray screening agent having an oxanilide structure (an oxanilide compound), an ultraviolet ray screening agent having a benzoate structure (a benzoate compound), and the like.

Examples of the ultraviolet ray screening agent containing a metal atom include platinum particles, particles in which the surface of platinum particles is coated with silica, palladium particles, particles in which the surface of palladium particles is coated with silica, and the like. It is preferred that the ultraviolet ray screening agent not be heat shielding particles.

The ultraviolet ray screening agent is preferably an ultraviolet ray screening agent having a benzotriazole structure, an ultraviolet ray screening agent having a benzophenone structure, an ultraviolet ray screening agent having a triazine structure, or an ultraviolet ray screening agent having a benzoate structure. The ultraviolet ray screening agent is more preferably an ultraviolet ray screening agent having a benzotriazole structure or an ultraviolet ray screening agent having a benzophenone structure, and is further preferably an ultraviolet ray screening agent having a benzotriazole structure.

Examples of the ultraviolet ray screening agent containing a metal oxide include zinc oxide, titanium oxide, cerium oxide, and the like. Furthermore, with regard to the ultraviolet ray screening agent containing a metal oxide, the surface may be coated. Examples of the coating material for the surface of the ultraviolet ray screening agent containing a metal oxide include an insulating metal oxide, a hydrolyzable organosilicon compound, a silicone compound, and the like.

Examples of the insulating metal oxide include silica, alumina, zirconia, and the like. For example, the insulating metal oxide has a band-gap energy of 5.0 eV or more.

Examples of the ultraviolet ray screening agent having a benzotriazole structure include 2-(2'-hydroxy-5'-methylphenyl)benzotriazole ("Tinuvin P" available from BASF Japan Ltd.), 2-(2'-hydroxy-3',5'-di-t-butylphenyl)benzotriazole ("Tinuvin 320" available from BASF Japan Ltd.), 2-(2'-hydroxy-3'-t-butyl-5-methylphenyl)-5-chlorobenzotriazole ("Tinuvin 326" available from BASF Japan Ltd.), 2-(2'-hydroxy-3',5'-di-amylphenyl)benzotriazole ("Tinuvin 328" available from BASF Japan Ltd.), and the like. It is preferred that the ultraviolet ray screening agent be an ultraviolet ray screening agent having a benzotriazole structure containing a halogen atom, and it is more preferred that the ultraviolet ray screening agent be an ultraviolet ray screening agent having a benzotriazole structure containing a chlorine atom, because those are excellent in ultraviolet ray screening performance.

Examples of the ultraviolet ray screening agent having a benzophenone structure include octabenzone ("Chimassorb 81" available from BASF Japan Ltd.), and the like.

Examples of the ultraviolet ray screening agent having a triazine structure include "LA-F70" available from ADEKA CORPORATION, 2-(4,6-diphenyl-1,3,5-triazine-2-yl)-5-[(hexyl)oxy]-phenol ("Tinuvin 1577FF" available from BASF Japan Ltd.), and the like.

Examples of the ultraviolet ray screening agent having a malonic acid ester structure include dimethyl 2-(p-methoxybenzylidene)malonate, tetraethyl-2,2-(1,4-phenylenedimethylidene)bismalonate, and 2-(p-methoxybenzylidene)-bis(1,2,2,6,6-pentamethyl-4-piperidinyl)malonate, and the like.

Examples of a commercial product of the ultraviolet ray screening agent having a malonic acid ester structure include Hostavin B-CAP, Hostavin PR-25 and Hostavin PR-31 (any of these is available from Clariant Japan K.K.).

Examples of the ultraviolet ray screening agent having an oxanilide structure include a kind of oxalic acid diamide having a substituted aryl group and the like on the nitrogen atom such as N-(2-ethylphenyl)-N'-(2-ethoxy-5-t-butylphenyl)oxalic acid diamide, N-(2-ethylphenyl)-N'-(2-ethoxyphenyl)oxalic acid diamide, and 2-ethyl-2'-ethoxy-oxalanilide ("Sanduvor VSU" available from Clariant Japan K.K.).

Examples of the ultraviolet ray screening agent having a benzoate structure include 2,4-di-tert-butylphenyl-3,5-di-tert-butyl-4-hydroxybenzoate ("Tinuvin 120" available from BASF Japan Ltd.), and the like.

In 100% by weight of the interlayer film or in 100% by weight of a layer containing the ultraviolet ray screening agent (a first layer, a second layer, or a third layer), the content of the ultraviolet ray screening agent and the content of the benzotriazole compound are preferably 0.1% by weight or more, more preferably 0.2% by weight or more, further preferably 0.3% by weight or more, especially preferably 0.5% by weight or more. In this case, the visible light transmittance becomes still less likely to decrease even when the interlayer film and the laminated glass are used for a long period. In 100% by weight of the interlayer film or in 100% by weight of a layer containing the ultraviolet ray screening agent (a first layer, a second layer, or a third layer), the content of the ultraviolet ray screening agent and the content of the benzotriazole compound are preferably 2.5% by weight or less, more preferably 2% by weight or less, further preferably 1% by weight or less, especially preferably 0.8% by weight or less. Especially, by setting the content of the ultraviolet ray screening agent to be 0.2% by weight or more in 100% by weight of a layer containing the ultraviolet ray screening agent, the visible light transmittance becomes still less likely to decrease even when the interlayer film and the laminated glass are used for a long period.

<Oxidation Inhibitor>

It is preferred that the interlayer film contain an oxidation inhibitor. It is preferred that the interlayer film contain an oxidation inhibitor in a region corresponding to the first region and in a region corresponding to the second region. It is preferred that the first layer contain an oxidation inhibitor. It is preferred that the first layer contain an oxidation inhibitor in a region corresponding to the first region and in a region corresponding to the second region. It is preferred that the second layer contain an oxidation inhibitor. It is preferred that the second layer contain an oxidation inhibitor in a region corresponding to the first region and in a region corresponding to the second region. It is preferred that the third layer contain an oxidation inhibitor. It is preferred that the third layer contain an oxidation inhibitor in a region corresponding to the first region and in a region corresponding to the second region. One kind of the oxidation inhibitor may be used alone, and two or more kinds thereof may be used in combination.

Examples of the oxidation inhibitor include a phenol-based oxidation inhibitor, a sulfur-based oxidation inhibitor, a phosphorus-based oxidation inhibitor, and the like. The phenol-based oxidation inhibitor is an oxidation inhibitor having a phenol skeleton. The sulfur-based oxidation inhibitor is an oxidation inhibitor containing a sulfur atom. The phosphorus-based oxidation inhibitor is an oxidation inhibitor containing a phosphorus atom.

It is preferred that the oxidation inhibitor be a phenol-based oxidation inhibitor or a phosphorus-based oxidation inhibitor.

Examples of the phenol-based oxidation inhibitor include 2,6-di-t-butyl-p-cresol (BHT), butyl hydroxyanisole (BHA), 2,6-di-t-butyl-4-ethylphenol, stearyl β-(3,5-di-t-butyl-4-hydroxyphenyl)propionate, 2,2'-methylenebis-(4-methyl-6-butylphenol), 2,2'-methylenebis-(4-ethyl-6-t-butylphenol), 4,4'-butylidene-bis-(3-methyl-6-t-butylphenol), 1,1,3-tris-(2-methyl-hydroxy-5-t-butylphenyl)butane, tetrakis[methylene-3-(3',5'-butyl-4-hydroxyphenyl)propionate]methane, 1,3,3-tris-(2-methyl-4-hydroxy-5-t-butylphenol)butane, 1,3,5-trimethyl-2,4,6-tris(3,5-di-t-butyl-4-hydroxybenzyl)benzene, bis(3,3'-t-butylphenol)butyric acid glycol ester, and bis(3-t-butyl-4-hydroxy-5-methylbenzenepropanoic acid) ethylenebis(oxyethylene), and the like. One kind or two or more kinds among these oxidation inhibitors are suitably used.

Examples of the phosphorus-based oxidation inhibitor include tridecyl phosphite, tris(tridecyl)phosphite, triphenyl phosphite, trinonylphenyl phosphite, bis(tridecyl)pentaerithritol diphosphite, bis(decyl)pentaerithritol diphosphite, tris(2,4-di-t-butylphenyl) phosphite, bis(2,4-di-t-butyl-6-methylphenyl)ethyl ester phosphorous acid, 2,2'-methylenebis(4,6-di-t-butyl-1-phenyloxy) (2-ethylhexyloxy)phosphorus, and the like. One kind or two or more kinds among these oxidation inhibitors are suitably used.

Examples of a commercial product of the oxidation inhibitor include "IRGANOX 245" available from BASF Japan Ltd., "IRGAFOS 168" available from BASF Japan Ltd., "IRGAFOS 38" available from BASF Japan Ltd., "Sumilizer BHT" available from Sumitomo Chemical Co., Ltd., "H-BHT" available from Sakai Chemical Industry Co., Ltd., and "IRGANOX 1010" available from BASF Japan Ltd., and the like.

From the viewpoint of maintaining high visible light transmittance of the interlayer film and the laminated glass over a long period of time, the content of the oxidation inhibitor is preferably 0.03% by weight or more, more preferably 0.1% by weight or more in 100% by weight of the interlayer film or in 100% by weight of the layer containing the oxidation inhibitor (a first layer, a second layer, or a third layer). Because of saturation of the effect of adding an oxidization inhibitor, it is preferred that the content of the oxidation inhibitor be 2% by weight or less in 100% by weight of the interlayer film or in 100% by weight of a layer containing the oxidation inhibitor (first layer, second layer or third layer).

<Other Ingredients>

Each of the interlayer film, the first layer, the second layer, and the third layer may contain additives such as a coloring agent, a coupling agent, a dispersing agent, a surfactant, a flame retardant, an antistatic agent, an adhesive force adjusting agent other than metal salt, a moisture-resistance agent, a fluorescent brightening agent, and an infrared ray absorber, as necessary. One kind of these additives may be used alone, and two or more kinds thereof may be used in combination.

<Other Details of Interlayer Film>

The interlayer film has one end and the other end being at an opposite side of the one end. The one end and the other end are both end parts facing each other in the interlayer film. The interlayer film may be an interlayer film in which the thickness of the one end and the thickness of the other end are the same, or may be an interlayer film in which the thickness of the other end is larger than the thickness of the one end.

The maximum thickness of the interlayer film is preferably 0.1 mm or more, more preferably 0.25 mm or more, further preferably 0.5 mm or more, especially preferably 0.8 mm or more and is preferably 3.8 mm or less, more preferably 2 mm or less, further preferably 1.5 mm or less.

From the viewpoint of the practical aspect and the viewpoint of sufficiently enhancing the adhesive force and the penetration resistance, the maximum thickness of a surface layer of the interlayer film is preferably 0.001 mm or more, more preferably 0.2 mm or more, further preferably 0.3 mm or more, and is preferably 1 mm or less, more preferably 0.8 mm or less.

From the viewpoint of the practical aspect and the viewpoint of sufficiently enhancing the penetration resistance, the maximum thickness of a layer (intermediate layer) arranged between two surface layers of the interlayer film is preferably 0.001 mm or more, more preferably 0.1 mm or more, and further preferably 0.2 mm or more and is preferably 0.8 mm or less, more preferably 0.6 mm or less, and further preferably 0.3 mm or less.

(Other Details of Laminated Glass)

The method for producing the laminated glass is not particularly limited. The laminated glass can be prepared by preparing an interlayer film having a region corresponding to the first region and a region corresponding to the second region, and then sandwiching the obtained interlayer film between the first lamination glass member and the second lamination glass member.

As a method for preparing an interlayer film having a region corresponding to the first region and a region corresponding to the second region, the following methods (1) and (2) and so on can be recited.

(1) An interlayer film having a region corresponding to the first region and a region corresponding to the second region is obtained while the number of layers of the interlayer film is varied or the composition of the interlayer film is varied between the region corresponding to the first region and the region corresponding to the second region.

(2) An interlayer film having only a region corresponding to the first region is prepared. Part of the interlayer film is removed by cutting or the like, and a material for a region corresponding to the second region or a layer having only a region corresponding to the second region is, for example, embedded, in the removed part. In this way, an interlayer film having a region corresponding to the first region and a region corresponding to the second region is obtained.

As a method for preparing laminated glass, the following method can be recited.

The obtained interlayer film is sandwiched between the first lamination glass member and the second lamination glass member to obtain a laminate. Then, for example, by passing the obtained laminate through pressure rolls or subjecting the obtained laminate to decompression suction in a rubber bag, the air remaining between the first and the second lamination glass members and the interlayer film is removed. Then, the laminate is preliminarily bonded together at about 70° C. to 110° C. to obtain a preliminarily press-bonded laminate. Next, by putting the preliminarily press-bonded laminate into an autoclave or by pressing the laminate, the laminate is press-bonded at about 120° C. to 150° C. and under a pressure of 1 MPa to 1.5 MPa. In this way, laminated glass can be obtained.

It is preferred that the laminated glass member be a laminated glass for vehicle. Examples of the vehicle include automobiles, railway vehicles, aircraft, and ships and the like. The laminated glass is suitably used for automobiles. The laminated glass is preferably used for a windshield, side glass, rear glass or roof glass and the like of automobile, more preferably used for a windshield or rear glass of automobile, and further preferably used for a windshield of automobile.

It is preferred that the laminated glass be used in combination with a remote sensing device such as LiDAR and the like.

The laminated glass may be a head-up display. The laminated glass may have a display region of a head-up display.

The laminated glass may be used while the first lamination glass member is arranged on the interior side of vehicle, or the laminated glass may be used while the second lamination glass member is arranged on the interior side of vehicle.

(Vehicle)

The vehicle according to the present invention includes a vehicle body, the above-described laminated glass, and a remote sensing device capable of applying light. In the vehicle of the present invention, the remote sensing device is arranged at such a position that light applied from the remote sensing device can penetrate the second region of the laminated glass. In the vehicle according to the present invention, light applied from the remote sensing device can penetrate the second region of the laminated glass.

The remote sensing device capable of applying the light is preferably a remote sensing device capable of applying an infrared ray. In the vehicle, it is preferred that the remote sensing device be arranged at such a position that an infrared ray applied from the remote sensing device can penetrate the second region of the laminated glass. In the vehicle, it is preferred that an infrared ray applied from the remote sensing device can penetrate the second region of the laminated glass.

Examples of the vehicle include automobiles, railway vehicles, aircraft, and ships and the like. Examples of the vehicle body include an automobile body, a railway vehicle body, an aircraft body, and a ship body and the like. It is preferred that the vehicle be an automobile, and the vehicle body be an automobile body.

In the vehicle, the first lamination glass member of the laminated glass may be arranged on the interior side of vehicle, or the second lamination glass member of the laminated glass may be arranged on the interior side of vehicle.

It is preferred that the remote sensing device be arranged inside the vehicle. The remote sensing device may be arranged on the surface of the lamination glass member on the interior side of vehicle, or may be arranged separately from the lamination glass member.

In the vehicle, at a wavelength of light (for example, infrared ray) applied from the remote sensing device, light transmittance of the second region of the laminated glass is higher than light transmittance of the first region of the laminated glass preferably by 5% or more, more preferably by 10% or more, further preferably by 20% or more.

In the vehicle, at a wavelength of light (for example, infrared ray) applied from the remote sensing device, light transmittance of the second region of the laminated glass is preferably 85% or more, more preferably by 90% or more, further preferably by 92% or more. When the light transmittance is the above lower limit or more, it is possible to transmit the light applied from the remote sensing device more satisfactorily.

The remote sensing device is preferably LiDAR, and more preferably LiDAR that enables 3D mapping of the peripheral environment of the vehicle.

It is more preferred that the remote sensing device be a scanning LiDAR, a rotating LiDAR, a flash LiDAR or a solid state LiDAR.

Hereinafter, the present invention will be described in more detail with reference to examples and comparative examples. The present invention is not limited only to these examples.

In polyvinyl acetal resins used, n-butyraldehyde that has 4 carbon atoms is used for the acetalization. With regard to the polyvinyl acetal resin, the acetalization degree (the butyralization degree), the acetylation degree and the content of the hydroxyl group were measured by a method conforming to JIS K6728 "Testing methods for polyvinyl butyral". In this connection, even in the cases of being measured according to ASTM D1396-92, numerical values similar to those obtained by a method conforming to JIS K6728 "Testing methods for polyvinyl butyral" were exhibited.

The following lamination glass members were prepared.

Lamination glass member A: Extra clear glass ("Borofloat" available from SCHOTT, light transmittance of 90% or more at every wavelength within the range of 380 nm to 2500 nm, thickness 2.0 mm)

Lamination glass member B: Clear glass (light transmittance of 83% or more and less than 91% at every wavelength within the range of 380 nm to 2500 nm (light transmittance of less than 85% at at least one wavelength within the range of 380 nm to 2500 nm), thickness 2.5 mm) Lamination glass member C: Green glass (light transmittance of 55% or more and less than 88% at every wavelength within the range of 380 nm to 2500 nm (light transmittance of less than 85% at at least one wavelength within the range of 380 nm to 2500 nm), thickness 2.0 mm)

The following materials for interlayer film were prepared.

(Thermoplastic Resin)

Polyvinyl acetal resin (PVB, average polymerization degree: 1700, content of hydroxyl group: 30% by mole, acetylation degree: 1% by mole, acetalization degree: 69% by mole)

(Plasticizer)

Triethylene glycol di-2-ethylhexanoate (3GO)

(Pigment or Heat Shielding Substance)

CWO particles (average particle diameter: 35 nm)

ITO particles (average particle diameter: 28 nm)

ATO particles (average particle diameter: 40 nm)

Carbon black (average particle diameter: 88 nm)

(Ultraviolet Ray Screening Agent)

Tinuvin 326 (2-(2'-hydroxy-3'-t-butyl-5-methylphenyl)-5-chlorobenzotriazole, "Tinuvin 326" available from BASF Japan Ltd.)

(Oxidation Inhibitor)

BHT (2,6-di-t-butyl-p-cresol)

(Heat Reflective Film)

Nano 90S (multilayer resin film, "Multilayer Nano 90S" available from Sumitomo 3M Limited)

XIR (resin film with metal foil, "XIR-75" available from Southwall Technologies)

The metal foil in XIR-75 has a five-layer structure of $In_2O_3/Ag/In_2O_3/Ag/In_2O_3$.

Example 1

(1) Preparation of Interlayer Film

Preparation of Material for Region Corresponding to First Region:

The following ingredients were mixed, and kneaded sufficiently with a mixing roll to prepare a material for a region corresponding to the first region.

PVB: 100 parts by weight

3GO: 40 parts by weight

CWO particles: An amount that is to be 0.04% by weight in 100% by weight of the region corresponding to the first region of the obtained interlayer film Tinuvin326: An amount that is to be 0.2% by weight in 100% by weight of the region corresponding to the first region of the obtained interlayer film BHT: An amount that is to be 0.2% by weight in 100% by weight of the region corresponding to the first region of the obtained interlayer film Preparation of Material for Region Corresponding to Second Region:

The following ingredients were mixed, and kneaded sufficiently with a mixing roll to prepare a material for a region corresponding to the second region.

PVB: 100 parts by weight

3GO: 40 parts by weight

Tinuvin326: An amount that is to be 0.2% by weight in 100% by weight of the region corresponding to the second region of the obtained interlayer film BHT: An amount that is to be 0.2% by weight in 100% by weight of the region corresponding to the second region of the obtained interlayer film Preparation of Interlayer Film:

The obtained material for a region corresponding to the first region was extruded with an extruder to obtain a layer A having a thickness of 760 μm. The obtained material for a region corresponding to the second region was extruded with an extruder to obtain a layer B having a thickness of 760 μm. Part of the obtained layer A was removed by cutting with a laser, and the obtained layer B was embedded in the removed part to obtain a one-layer interlayer film of 760 μm thick having only the first layer.

(2) Preparation of Laminated Glass

The obtained interlayer film was cut into a size of 100 cm long×100 cm wide. Also, two sheets of lamination glass member A (100 cm long×100 cm wide) were prepared.

Between two sheets of lamination glass member A, the obtained interlayer film was sandwiched and temporarily press-bonded by a vacuum bagging method. The temporarily press-bonded laminate was retained for 10 minutes in an autoclave at a temperature of 140° C. and a pressure of 1.3 MPa, and then the temperature was lowered to 50° C. to complete permanent press-bonding to obtain a laminated glass. The first region R1 (first region R1), the second region R2, and the first region R1 (second first region R1) were formed in this order from one end part toward the other end part of the laminated glass.

Examples 2 to 7

An interlayer film for laminated glass and a laminated glass were obtained in the same manner as that in Example 1 except that the configuration of the interlayer film (thickness, the kind and the content of the pigment or the heat shielding substance) and the kind of the lamination glass member were changed to that shown in Tables 1, 2. The ultraviolet ray screening agent and the oxidation inhibitor that are not described in Table were used in the same blending amounts as those in Example 1.

Comparative Example 1

(1) Preparation of Interlayer Film

The following ingredients were mixed, and kneaded sufficiently with a mixing roll to prepare a material for an interlayer film.

PVB: 100 parts by weight
3GO: 40 parts by weight
Tinuvin326: Amount that is to be 0.2% by weight in 100% by weight of obtained interlayer film
BHT: Amount that is to be 0.2% by weight in 100% by weight of obtained interlayer film The obtained material for an interlayer film was extruded with an extruder to obtain a one-layer interlayer film with 760 μm thick having only the first layer.

(2) Preparation of Laminated Glass

Laminated glass was obtained in the same manner as that in Example 1 except that the obtained interlayer film was used.

Comparative Example 2

(1) Preparation of Interlayer Film

The following ingredients were mixed, and kneaded sufficiently with a mixing roll to prepare a material for an interlayer film.

PVB: 100 parts by weight
3GO: 40 parts by weight
CWO particles: An amount that is to be 0.04% by weight in 100% by weight of obtained interlayer film
Tinuvin326: Amount that is to be 0.2% by weight in 100% by weight of obtained interlayer film
BHT: Amount that is to be 0.2% by weight in 100% by weight of obtained interlayer film The obtained material for an interlayer film was extruded with an extruder to obtain a one-layer interlayer film with 760 μm thick having only the first layer.

(2) Preparation of Laminated Glass

Laminated glass was obtained in the same manner as that in Example 1 except that the obtained interlayer film was used.

Comparative Example 3

An interlayer film for laminated glass and a laminated glass were obtained in the same manner as in Comparative Example 2 except that ITO particles in an amount that is to be 0.5% by weight in 100% by weight of the obtained interlayer film were used in place of the CWO particles. The ultraviolet ray screening agent and the oxidation inhibitor that are not described in Table were used in the same blending amounts as those in Comparative Example 2.

Comparative Examples 4 to 7

An interlayer film for laminated glass and a laminated glass were obtained in the same manner as that in Comparative Example 1 except that the kind of the lamination glass member was changed to that shown in Tables 3, 4. The ultraviolet ray screening agent and the oxidation inhibitor that are not described in Table were used in the same blending amounts as those in Comparative Example 1.

Examples 8 to 14 and Comparative Examples 8 to 15

An interlayer film for laminated glass and a laminated glass were obtained in the same manner as that in Example 1 except that the configuration of the interlayer film (thickness, the kind and the content of the pigment or the heat shielding substance, kind of heat reflective film) and the kind of the lamination glass member were changed to those shown in Tables 5 to 10. The ultraviolet ray screening agent and the oxidation inhibitor that are not described in Table were used in the same blending amounts as those in Example 1.

In Examples 8, 9 and Comparative Examples 8 to 10, a heat reflective film was used. Regarding the interlayer film containing a heat reflective film in at least one of the first region and the second region, the heat reflective film was arranged as an intermediate layer between two surface layers (including ingredients in Table).

In Examples 10 to 12, and Comparative Examples 11 to 15, a plurality of kinds of pigments or heat shielding substances were used.

In Examples 13, 14, an interlayer film in which the thickness of the other end is larger than the thickness of one end (interlayer film having a wedge-like sectional shape in the thickness direction) was prepared.

(Evaluation)

(1) Light Transmittance at Wavelength of 850 nm and at Wavelength of 950 nm (T850 and T950)

Light transmittance at a wavelength of 850 nm and at a wavelength of 950 nm of the obtained laminated glass was measured by using a spectrophotometer ("U-4100" available from Hitachi High-Tech Corporation).

In the laminated glasses obtained in Examples 1 to 14, light transmittance differed between the region where a pigment or a heat shielding substance exists, and a region where a pigment or a heat shielding substance does not exist by 5% or more at a wavelength of 850 nm and a wavelength of 950 nm. Therefore, the laminated glasses obtained in Examples 1 to 14 have the first region and the second region.

Meanwhile, the laminated glasses obtained in Comparative Examples 1 to 8, and 11 to 13 did not have regions having light transmittances that are different from each other by 5% or more at every wavelength within the range of 380 nm to 2500 nm. Therefore, the laminated glasses obtained in Comparative Examples 1 to 8, and 11 to 13 do not have the first region and the second region. In the later-described table, for ease of comparison between Example and Comparative Example, the first region and the second region are described also in Comparative Example.

Also, difference between light transmittance at a wavelength of 850 nm of the second region, and light transmittance at a wavelength of 850 nm of the first region (difference in light transmittance between first region and second region: ΔT850) was calculated. Also, difference between light transmittance at a wavelength of 950 nm of the second region, and light transmittance at a wavelength of 950 nm of the first region (difference in light transmittance between first region and second region: ΔT950) was calculated.

(2) Visible Light Transmittance

Visible light transmittance at a wavelength of 380 nm to 780 nm of the obtained laminated glass was measured by using a spectrophotometer ("U-4100" available from Hitachi High-Tech Science Corporation) in accordance with JIS R3106:1998. Visible light transmittance was measured in each of the first region and the second region of the laminated glass.

(3) Solar Transmittance

Solar transmittance (Tds: Solar Direct Transmittance) at a wavelength ranging from 300 nm to 2500 nm of the obtained laminated glass was measured by using a spectrophotometer ("U-4100" available from Hitachi High-Tech Corporation) in accordance with JIS R3106:1998. Solar transmittance was measured in each of the first region and the second region of the laminated glass.

(4) Hue

In L*a*b* color system of the obtained laminated glass, a* and b* were measured in accordance with JIS Z8781-4:2013. It is to be noted that a* and b* were measured in each of the first region and the second region of the laminated glass.

The configurations and the results of laminated glasses are shown in the following Tables 1 to 10.

TABLE 1

| | | | | Example 1 | Example 2 | Example 3 | Example 4 |
|---|---|---|---|---|---|---|---|
| First lamination glass member | | | Kind | A | A | A | A |
| Interlayer film | Region corresponding to first region | Thermoplastic resin | Kind | PVB | PVB | PVB | PVB |
| | | | parts by weight | 100 | 100 | 100 | 100 |
| | | Plasticizer | Kind | 3GO | 3GO | 3GO | 3GO |
| | | | parts by weight | 40 | 40 | 40 | 40 |
| | | Pigment or heat shielding substance | Kind | CWO particles | CWO particles | ITO particles | ITO particles |
| | | | % by weight | 0.04 | 0.14 | 0.15 | 0.5 |
| | Region corresponding to second region | Thermoplastic resin | Kind | PVB | PVB | PVB | PVB |
| | | | parts by weight | 100 | 100 | 100 | 100 |
| | | Plasticizer | Kind | 3GO | 3GO | 3GO | 3GO |
| | | | parts by weight | 40 | 40 | 40 | 40 |
| | | Pigment or heat shielding substance | Kind | — | — | — | — |
| | | | % by weight | — | — | — | — |
| | Thickness of one end | | μm | 760 | 760 | 760 | 760 |
| | Thickness of other end | | μm | 760 | 760 | 760 | 760 |
| Second lamination glass member | | | Kind | A | A | A | A |
| First region of laminated glass | Visible light transmittance | | % | 87.8 | 77.5 | 91.3 | 89.2 |
| | Solar transmittance | | % | 74.4 | 57.6 | 79.4 | 73.2 |
| | Hue | a* | | — | −2.2 | −4.8 | −1.5 | −2.3 |
| | | b* | | — | 2.2 | 1.2 | 3.2 | 4.3 |
| | T850 | | % | 60.5 | 21.0 | 87.1 | 77.6 |
| | T950 | | % | 56.3 | 16.4 | 84.0 | 69.6 |
| Second region of laminated glass | Visible light transmittance | | % | 92.3 | 92.3 | 92.3 | 92.3 |
| | Solar transmittance | | % | 87.7 | 87.7 | 87.7 | 87.7 |
| | Hue | a* | | — | −1.1 | −1.1 | −1.1 | −1.1 |
| | | b* | | — | 2.7 | 2.7 | 2.7 | 2.7 |
| | T850 | | % | 92.3 | 92.3 | 92.3 | 92.3 |
| | T950 | | % | 92.3 | 92.3 | 92.3 | 92.3 |
| Difference in light transmittance between first region and second region | ΔT850 | | % | 31.9 | 71.4 | 5.2 | 14.8 |
| | ΔT950 | | % | 36.0 | 75.9 | 8.3 | 22.7 |

TABLE 2

|  |  |  |  | Example 5 | Example 6 | Example 7 |
|---|---|---|---|---|---|---|
| First lamination glass member |  |  | Kind | A | A | A |
| Interlayer film | Region corresponding to first region | Thermoplastic resin | Kind | PVB | PVB | PVB |
|  |  |  | parts by weight | 100 | 100 | 100 |
|  |  | Plasticizer | Kind | 3GO | 3GO | 3GO |
|  |  |  | parts by weight | 40 | 40 | 40 |
|  |  | Pigment or heat shielding substance | Kind | ATO particles | Carbon black | CWO particles |
|  |  |  | % by weight | 0.2 | 0.005 | 0.04 |
|  | Region corresponding to second region | Thermoplastic resin | Kind | PVB | PVB | PVB |
|  |  |  | parts by weight | 100 | 100 | 100 |
|  |  | Plasticizer | Kind | 3GO | 3GO | 3GO |
|  |  |  | parts by weight | 40 | 40 | 40 |
|  |  | Pigment or heat shielding substance | Kind | — | — | — |
|  |  |  | % by weight | — | — | — |
|  | Thickness of one end |  | μm | 760 | 760 | 760 |
|  | Thickness of other end |  | μm | 760 | 760 | 760 |
| Second lamination glass member |  |  | Kind | A | A | B |
| First region of laminated glass | Visible light transmittance |  | % | 81.7 | 75.4 | 86.1 |
|  | Solar transmittance |  | % | 73.8 | 78.9 | 63.5 |
|  | Hue | a* |  | −1.9 | −0.5 | −2.4 |
|  |  | b* |  | 3.1 | 5.3 | 1.6 |
|  | T850 |  | % | 74.3 | 79.5 | 55.8 |
|  | T950 |  | % | 69.7 | 80.5 | 51.3 |
| Second region of laminated glass | Visible light transmittance |  | % | 92.3 | 92.3 | 90.5 |
|  | Solar transmittance |  | % | 87.7 | 87.7 | 84.6 |
|  | Hue | a* |  | −1.1 | −1.1 | −1.2 |
|  |  | b* |  | 2.7 | 2.7 | 1.6 |
|  | T850 |  | % | 92.3 | 92.3 | 85.2 |
|  | T950 |  | % | 92.3 | 92.3 | 84.0 |
| Difference in light transmittance between first region and second region | ΔT850 |  | % | 18.1 | 12.8 | 29.4 |
|  | ΔT950 |  | % | 22.6 | 11.8 | 32.7 |

TABLE 3

|  |  |  |  | Comparative Example 1 | Comparative Example 2 | Comparative Example 3 | Comparative Example 4 |
|---|---|---|---|---|---|---|---|
| First lamination glass member |  |  | Kind | A | A | A | A |
| Interlayer film | Region corresponding to first region | Thermoplastic resin | Kind | PVB | PVB | PVB | PVB |
|  |  |  | parts by weight | 100 | 100 | 100 | 100 |
|  |  | Plasticizer | Kind | 3GO | 3GO | 3GO | 3GO |
|  |  |  | parts by weight | 40 | 40 | 40 | 40 |
|  |  | Pigment or heat shielding substance | Kind | — | CWO particles | ITO particles | — |
|  |  |  | % by weight | — | 0.04 | 0.5 | — |
|  | Region corresponding to second region | Thermoplastic resin | Kind | PVB | PVB | PVB | PVB |
|  |  |  | parts by weight | 100 | 100 | 100 | 100 |
|  |  | Plasticizer | Kind | 3GO | 3GO | 3GO | 3GO |
|  |  |  | parts by weight | 40 | 40 | 40 | 40 |

TABLE 3-continued

|  |  |  | Comparative Example 1 | Comparative Example 2 | Comparative Example 3 | Comparative Example 4 |
|---|---|---|---|---|---|---|
|  | Pigment or heat shielding substance | Kind | — | CWO particles | ITO particles | — |
|  |  | % by weight | — | 0.04 | 0.5 | — |
|  | Thickness of one end | μm | 760 | 760 | 760 | 760 |
|  | Thickness of other end | μm | 760 | 760 | 760 | 760 |
| Second lamination glass member |  | Kind | A | A | A | B |
| First region of laminated glass | Visible light transmittance | % | 92.3 | 87.8 | 89.2 | 90.5 |
|  | Solar transmittance |  | 87.7 | 74.4 | 73.2 | 84.6 |
|  | Hue a* |  | — | −1.1 | −2.2 | −2.3 | −1.2 |
|  | b* |  | — | 2.7 | 2.2 | 4.3 | 1.6 |
|  | T850 | % | 92.3 | 60.5 | 77.6 | 85.2 |
|  | T950 | % | 92.3 | 56.3 | 69.6 | 84.0 |
| Second region of laminated glass | Visible light transmittance | % | 92.3 | 87.8 | 89.2 | 90.5 |
|  | Solar transmittance | % | 87.7 | 74.4 | 73.2 | 84.6 |
|  | Hue a* |  | — | −1.1 | −2.2 | −2.3 | −1.2 |
|  | b* |  | — | 2.7 | 2.2 | 4.3 | 1.6 |
|  | T850 | % | 92.3 | 60.5 | 77.6 | 85.2 |
|  | T950 | % | 92.3 | 56.3 | 69.6 | 84.0 |
| Difference in light transmittance between first region and second region | ΔT850 | % | 0.0 | 0.0 | 0.0 | 0.0 |
|  | ΔT950 | % | 0.0 | 0.0 | 0.0 | 0.0 |

TABLE 4

|  |  |  |  | Comparative Example 5 | Comparative Example 6 | Comparative Example 7 |
|---|---|---|---|---|---|---|
| First lamination glass member |  |  | Kind | B | A | C |
| Interlayer film | Region corresponding to first region | Thermoplastic resin | Kind | PVB | PVB | PVB |
|  |  |  | parts by weight | 100 | 100 | 100 |
|  |  | Plasticizer | Kind | 3GO | 3GO | 3GO |
|  |  |  | parts by weight | 40 | 40 | 40 |
|  |  | Pigment or heat shielding substance | Kind | — | — | — |
|  |  |  | % by weight | — | — | — |
|  | Region corresponding to second region | Thermoplastic resin | Kind | PVB | PVB | PVB |
|  |  |  | parts by weight | 100 | 100 | 100 |
|  |  | Plasticizer | Kind | 3GO | 3GO | 3GO |
|  |  |  | parts by weight | 40 | 40 | 40 |
|  |  | Pigment or heat shielding substance | Kind | — | — | — |
|  |  |  | % by weight | — | — | — |
|  | Thickness of one end |  | μm | 760 | 760 | 760 |
|  | Thickness of other end |  | μm | 760 | 760 | 760 |
| Second lamination glass member |  |  | Kind | B | C | C |
| First region of laminated glass | Visible light transmittance |  | % | 88.7 | 83.7 | 80.7 |
|  | Solar transmittance |  | % | 83.1 | 72.7 | 66.0 |
|  | Hue a* |  |  | −1.5 | −3.5 | −5.3 |
|  | b* |  |  | 1.1 | 1.2 | 1.7 |
|  | T850 |  | % | 78.7 | 57.1 | 41.6 |
|  | T950 |  | % | 76.5 | 52.5 | 36.2 |

TABLE 4-continued

|  |  |  | Comparative Example 5 | Comparative Example 6 | Comparative Example 7 |
|---|---|---|---|---|---|
| Second region of laminated glass | Visible light transmittance | % | 88.7 | 83.7 | 80.7 |
|  | Solar transmittance | % | 83.1 | 72.7 | 66.0 |
|  | Hue a* | — | — | −1.5 | −3.5 | −5.3 |
|  | b* | — | — | 1.1 | 1.2 | 1.7 |
|  | T850 | % | 78.7 | 57.1 | 41.6 |
|  | T950 | % | 76.5 | 52.5 | 36.2 |
| Difference in light transmittance between first region and second region | ΔT850 | % | 0.0 | 0.0 | 0.0 |
|  | ΔT950 | % | 0.0 | 0.0 | 0.0 |

TABLE 5

|  |  |  |  | Example 8 | Example 9 |
|---|---|---|---|---|---|
| First lamination glass member |  |  | Kind | A | A |
| Interlayer film | Region corresponding to first region | Thermoplastic resin | Kind | PVB | PVB |
|  |  |  | parts by weight | 100 | 100 |
|  |  | Plasticizer | Kind | 3GO | 3GO |
|  |  |  | parts by weight | 40 | 40 |
|  |  | Heat reflective film | Kind | Nano90S | XIR |
|  | Region corresponding to second region | Thermoplastic resin | Kind | PVB | PVB |
|  |  |  | parts by weight | 100 | 100 |
|  |  | Plasticizer | Kind | 3GO | 3GO |
|  |  |  | parts by weight | 40 | 40 |
|  |  | Heat reflective film | Kind | — | — |
|  | Thickness of one end |  | μm | 760 | 760 |
|  | Thickness of other end |  | μm | 760 | 760 |
| Second lamination glass member |  |  | Kind | A | A |
| First region of laminated glass | Visible light transmittance |  | % | 89.8 | 79.9 |
|  | Solar transmittance |  | % | 68.1 | 49.2 |
|  | Hue a* |  | — | −0.8 | −1.7 |
|  | b* |  | — | 3.5 | 4.0 |
|  | T850 |  | % | 86.6 | 42.8 |
|  | T950 |  | % | 3.3 | 28.1 |
| Second region of laminated glass | Visible light transmittance |  | % | 92.3 | 92.3 |
|  | Solar transmittance |  | % | 87.7 | 87.7 |
|  | Hue a* |  | — | −1.1 | −1.1 |
|  | b* |  | — | 2.7 | 2.7 |
|  | T850 |  | % | 92.3 | 92.3 |
|  | T950 |  | % | 92.3 | 92.3 |
| Difference in light transmittance between first region and second region | ΔT850 |  | % | 5.7 | 49.6 |
|  | ΔT950 |  | % | 89.0 | 64.2 |

TABLE 6

|  |  |  |  | Comparative Example 8 | Comparative Example 9 | Comparative Example 10 |
|---|---|---|---|---|---|---|
| First lamination glass member |  |  | Kind | A | B | B |
| Interlayer film | Region corresponding to first region | Thermoplastic resin | Kind | PVB | PVB | PVB |
|  |  |  | parts by weight | 100 | 100 | 100 |
|  |  | Plasticizer | Kind | 3GO | 3GO | 3GO |
|  |  |  | parts by weight | 40 | 40 | 40 |

TABLE 6-continued

| | | | | Comparative Example 8 | Comparative Example 9 | Comparative Example 10 |
|---|---|---|---|---|---|---|
| | Region corresponding to second region | Heat reflective film | Kind | XIR | Nano90S | XIR |
| | | Thermoplastic resin | Kind | PVB | PVB | PVB |
| | | | parts by weight | 100 | 100 | 100 |
| | | Plasticizer | Kind | 3GO | 3GO | 3GO |
| | | | parts by weight | 40 | 40 | 40 |
| | | Heat reflective film | Kind | XIR | — | — |
| | Thickness of one end | | μm | 760 | 760 | 760 |
| | Thickness of other end | | μm | 760 | 760 | 760 |
| Second lamination glass member | | | Kind | A | B | B |
| First region of laminated glass | Visible light transmittance | | % | 79.9 | 86.2 | 76.9 |
| | Solar transmittance | | % | 49.2 | 62.3 | 45.5 |
| | Hue | a* | — | −1.7 | −1.4 | 90.3 |
| | | b* | — | 4.0 | 2.6 | −2.4 |
| | T850 | | % | 42.8 | 73.8 | 36.4 |
| | T950 | | % | 28.1 | 2.7 | 23.3 |
| Second region of laminated glass | Visible light transmittance | | % | 79.9 | 88.7 | 88.7 |
| | Solar transmittance | | % | 49.2 | 83.1 | 83.1 |
| | Hue | a* | — | −1.7 | −1.5 | −1.5 |
| | | b* | — | 4.0 | 1.1 | 1.1 |
| | T850 | | % | 42.8 | 78.7 | 78.7 |
| | T950 | | % | 28.1 | 76.5 | 76.5 |
| Difference in light transmittance between first region and second region | ΔT850 | | % | 0.0 | 4.9 | 42.2 |
| | ΔT950 | | % | 0.0 | 73.8 | 53.2 |

TABLE 7

| | | | | Example 10 | Example 11 | Example 12 |
|---|---|---|---|---|---|---|
| First lamination glass member | | | Kind | A | A | A |
| Interlayer film | Region corresponding to first region | Thermoplastic resin | Kind | PVB | PVB | PVB |
| | | | parts by weight | 100 | 100 | 100 |
| | | Plasticizer | Kind | 3GO | 3GO | 3GO |
| | | | parts by weight | 40 | 40 | 40 |
| | | Pigment or heat shielding substance (first kind) | Kind | ITO particles | ITO particles | CWO particles |
| | | | % by weight | 0.15 | 0.15 | 0.04 |
| | | Pigment or heat shielding substance (second kind) | Kind | CWO particles | CWO particles | Carbon black |
| | | | % by weight | 0.04 | 0.06 | 0.05 |
| | Region corresponding to second region | Thermoplastic resin | Kind | PVB | PVB | PVB |
| | | | parts by weight | 100 | 100 | 100 |
| | | Plasticizer | Kind | 3GO | 3GO | 3GO |
| | | | parts by weight | 40 | 40 | 40 |
| | | Pigment or heat shielding substance (first kind) | Kind | — | — | — |
| | | | % by weight | — | — | — |

TABLE 7-continued

|  |  |  | Example 10 | Example 11 | Example 12 |
|---|---|---|---|---|---|
|  | Pigment or heat shielding substance (second kind) | Kind | — | — | — |
|  |  | % by weight | — | — | — |
|  | Thickness of one end | μm | 760 | 760 | 760 |
|  | Thickness of other end | μm | 760 | 760 | 760 |
| Second lamination glass member |  | Kind | A | A | A |
| First region of laminated glass | Visible light transmittance | % | 87.0 | 84.9 | 71.7 |
|  | Solar transmittance | % | 61.1 | 55.8 | 56.3 |
|  | Hue a* | — | −2.5 | −3.0 | −1.5 |
|  | b* | — | 2.6 | 2.4 | 4.8 |
|  | T850 | % | 57.9 | 46.9 | 49.2 |
|  | T950 | % | 52.5 | 41.0 | 52.1 |
| Second region of laminated glass | Visible light transmittance | % | 92.3 | 92.3 | 92.3 |
|  | Solar transmittance | % | 87.7 | 87.7 | 87.7 |
|  | Hue a* | — | −1.1 | −1.1 | −1.1 |
|  | b* | — | 2.7 | 2.7 | 2.7 |
|  | T850 | % | 92.3 | 92.3 | 92.3 |
|  | T950 | % | 92.3 | 92.3 | 92.3 |
| Difference in light transmittance between first region and second region | ΔT850 | % | 34.4 | 45.5 | 43.2 |
|  | ΔT950 | % | 39.8 | 51.3 | 40.2 |

TABLE 8

|  |  |  |  | Comparative Example 11 | Comparative Example 12 | Comparative Example 13 |
|---|---|---|---|---|---|---|
| First lamination glass member |  |  | Kind | A | A | A |
| Interlayer film | Region corresponding to first region | Thermoplastic resin | Kind | PVB | PVB | PVB |
|  |  |  | parts by weight | 100 | 100 | 100 |
|  |  | Plasticizer | Kind | 3GO | 3GO | 3GO |
|  |  |  | parts by weight | 40 | 40 | 40 |
|  |  | Pigment or heat shielding substance (first kind) | Kind | ITO particles | ITO particles | CWO particles |
|  |  |  | % by weight | 0.15 | 0.15 | 0.04 |
|  |  | Pigment or heat shielding substance (second kind) | Kind | CWO particles | CWO particles | Carbon black |
|  |  |  | % by weight | 0.04 | 0.06 | 0.05 |
|  | Region corresponding to second region | Thermoplastic resin | Kind | PVB | PVB | PVB |
|  |  |  | parts by weight | 100 | 100 | 100 |
|  |  | Plasticizer | Kind | 3GO | 3GO | 3GO |
|  |  |  | parts by weight | 40 | 40 | 40 |
|  |  | Pigment or heat shielding substance (first kind) | Kind | ITO particles | ITO particles | CWO particles |
|  |  |  | % by weight | 0.15 | 0.15 | 0.04 |
|  |  | Pigment or heat shielding substance (second kind) | Kind | CWO particles | CWO particles | Carbon black |
|  |  |  | % by weight | 0.04 | 0.06 | 0.05 |
|  | Thickness of one end |  | μm | 760 | 760 | 760 |
|  | Thickness of other end |  | μm | 760 | 760 | 760 |

TABLE 8-continued

|  |  |  | Comparative Example 11 | Comparative Example 12 | Comparative Example 13 |
|---|---|---|---|---|---|
| Second lamination glass member |  | Kind | A | A | A |
| First region of laminated glass | Visible light transmittance | % | 87.0 | 84.9 | 71.7 |
|  | Solar transmittance | % | 61.1 | 55.8 | 56.3 |
|  | Hue a* |  | — | −2.5 | −3.0 | −1.5 |
|  | b* |  | — | 2.6 | 2.4 | 4.8 |
|  | T850 | % | 57.9 | 46.9 | 49.2 |
|  | T950 | % | 52.5 | 41.0 | 52.1 |
| Second region of laminated glass | Visible light transmittance | % | 87.0 | 84.9 | 71.7 |
|  | Solar transmittance | % | 61.1 | 55.8 | 56.3 |
|  | Hue a* |  | — | −2.5 | −3.0 | −1.5 |
|  | b* |  | — | 2.6 | 2.4 | 4.8 |
|  | T850 | % | 57.9 | 46.9 | 49.2 |
|  | T950 | % | 52.5 | 41.0 | 52.1 |
| Difference in light transmittance between first region and second region | ΔT850 | % | 0.0 | 0.0 | 0.0 |
|  | ΔT950 | % | 0.0 | 0.0 | 0.0 |

TABLE 9

|  |  |  |  | Comparative Example 14 | Comparative Example 15 |
|---|---|---|---|---|---|
| First lamination glass member |  |  | Kind | B | B |
| Interlayer film | Region corresponding to first region | Thermoplastic resin | Kind | PVB | PVB |
|  |  |  | parts by weight | 100 | 100 |
|  |  | Plasticizer | Kind | 3GO | 3GO |
|  |  |  | parts by weight | 40 | 40 |
|  |  | Pigment or heat shielding substance (first kind) | Kind | ITO particles | ITO particles |
|  |  |  | parts by weight | 0.15 | 0.15 |
|  |  | Pigment or heat shielding substance (second kind) | Kind | CWO particles | CWO particles |
|  |  |  | parts by weight | 0.04 | 0.06 |
|  | Region corresponding to second region | Thermoplastic resin | Kind | PVB | PVB |
|  |  |  | parts by weight | 100 | 100 |
|  |  | Plasticizer | Kind | 3GO | 3GO |
|  |  |  | parts by weight | 40 | 40 |
|  |  | Pigment or heat shielding substance (first kind) | Kind | — | — |
|  |  |  | % by weight | — | — |
|  |  | Pigment or heat shielding substance (second kind) | Kind | — | — |
|  |  |  | % by weight | — | — |
|  | Thickness of one end |  | μm | 760 | 760 |
|  | Thickness of other end |  | μm | 760 | 760 |
| Second lamination glass member |  | Kind |  | B | B |
| First region of laminated glass | Visible light transmittance | % |  | 83.3 | 81.3 |
|  | Solar transmittance | % |  | 54.6 | 50.1 |
|  | Hue a* |  |  | — | −3.5 | −4.0 |
|  | b* |  |  | — | 1.9 | 1.6 |
|  | T850 | % |  | 42.8 | 33.5 |
|  | T950 | % |  | 48.7 | 39.4 |
| Second region of laminated glass | Visible light transmittance | % |  | 88.7 | 88.7 |
|  | Solar transmittance | % |  | 83.1 | 83.1 |
|  | Hue a* |  |  | — | −1.5 | −1.5 |
|  | b* |  |  | — | 1.1 | 1.1 |

TABLE 9-continued

|  |  |  | Comparative Example 14 | Comparative Example 15 |
|---|---|---|---|---|
|  | T850 | % | 78.7 | 78.7 |
|  | T950 | % | 76.5 | 76.5 |
| Difference in light transmittance between first region and second region | ΔT850 | % | 35.9 | 45.2 |
|  | ΔT950 | % | 27.8 | 37.1 |

TABLE 10

|  |  |  |  | Example 13 | Example 14 |
|---|---|---|---|---|---|
| First lamination glass member |  |  | Kind | A | A |
| Interlayer film | Region corresponding to first region | Thermoplastic resin | Kind | PVB | PVB |
|  |  |  | parts by weight | 100 | 100 |
|  |  | Plasticizer | Kind | 3GO | 3GO |
|  |  |  | parts by weight | 40 | 40 |
|  |  | Pigment or heat shielding substance | Kind | CWO particles | ITO particles |
|  |  |  | parts by weight | 0.04 | 0.5 |
|  | Region corresponding to second region | Thermoplastic resin | Kind | PVB | PVB |
|  |  |  | parts by weight | 100 | 100 |
|  |  | Plasticizer | Kind | 3GO | 3GO |
|  |  |  | parts by weight | 40 | 40 |
|  |  | Pigment or heat shielding substance | Kind | — | — |
|  |  |  | % by weight | — | — |
|  | Thickness of one end |  | μm | 784 | 788 |
|  | Thickness of other end |  | μm | 1231 | 1249 |
|  | Wedge angle |  | mrad | 0.45 | 0.46 |
| Second lamination glass member |  |  | Kind | A | A |
| First region of laminated glass | Visible light transmittance |  | % | 87.8 | 89.2 |
|  | Solar transmittance |  | % | 74.4 | 73.2 |
|  | Hue | a* | — | −2.2 | −2.3 |
|  |  | b* | — | 2.2 | 4.3 |
|  | T850 |  | % | 60.5 | 77.6 |
|  | T950 |  | % | 56.3 | 69.6 |
| Second region of laminated glass | Visible light transmittance |  | % | 91.2 | 91.3 |
|  | Solar transmittance |  | % | 87.3 | 87.2 |
|  | Hue | a* | — | −1.2 | −1.2 |
|  |  | b* | — | 2.8 | 2.8 |
|  | T850 |  | % | 92.1 | 92.0 |
|  | T950 |  | % | 92.1 | 92.0 |
| Difference in light transmittance between first region and second region | ΔT850 |  | % | 31.6 | 14.4 |
|  | ΔT950 |  | % | 35.8 | 22.4 |

In the laminated glasses obtained in Examples 1 to 14, since infrared transmittance of the second region (T850 and T950) is high, when a remote sensing device capable of applying an infrared ray is used, it is possible to satisfactorily transmit the infrared ray applied from the remote sensing device in the second region. Also, in the laminated glasses obtained in Examples 1 to 14, since solar transmittance of the first region is low, it is possible to enhance the heat shielding property in the first region. As a result, in the laminated glasses obtained in Examples 1 to 14, it is possible to transmit an infrared light applied from the remote sensing device satisfactorily, and it is possible to enhance the heat shielding property.

In contrast, in the laminated glass obtained in Comparative Example 1, it is difficult to enhance the heat shielding property because solar transmittance is high although infrared transmittance (T850 and T950) can be enhanced. In the laminated glasses obtained in Comparative Examples 2 to 3, and 5 to 15, since infrared transmittance (T850 and T950) is low, it is difficult to transmit an infrared ray applied from the remote sensing device satisfactorily. Further, in the laminated glasses obtained in Comparative Examples 4 and 5, since solar transmittance is also high, it is difficult to enhance the heat shielding property.

EXPLANATION OF SYMBOLS 1, 1B, 1C, 1D, 1E, 1F, 1G, 1H: First layer
1Da, 1Fa, 1Ha: Portion having rectangular sectional shape in thickness direction
1Db, 1Fb, 1Hb: Portion having wedge-like sectional shape in thickness direction
2, 2B, 2C, 2E, 2G: Second layer
3, 3B, 3C, 3E, 3G: Third layer
11, 11B, 11C, 11E, 11G: Interlayer film
11A, 11D, 11F, 11H: Interlayer film (first layer)
11a: One end
11b: Other end
21: First lamination glass member
22: Second lamination glass member
31, 31A, 31B: Laminated glass
51: Remote sensing device
L: Light
R1: First region
R2: Second region
r1: Region for display
r2: Surrounding region

The invention claimed is:

1. A laminated glass comprising a first lamination glass member, a second lamination glass member, and an interlayer film,
the interlayer film being arranged between the first lamination glass member and the second lamination glass member,
the first lamination glass member having a light transmittance of 85% or more at every wavelength within a range of 380 nm to 2500 nm,
the laminated glass having a first region and a second region,
the second region having a light transmittance of higher than a light transmittance of the first region by 5% or more at at least one wavelength within a range of 380 nm to 2500 nm.

2. The laminated glass according to claim 1, wherein light transmittance of the second region is higher than light transmittance of the first region by 5% or more at at least one wavelength within a range of 780 nm to 1000 nm.

3. The laminated glass according to claim 1, wherein light transmittance of the second region is 90% or more at at least one wavelength within a range of 780 nm to 1000 nm.

4. The laminated glass according to claim 1, wherein a region of 0 cm to 30 cm from at least one end part of the laminated glass to an inner side of the laminated glass has the second region.

5. The laminated glass according to claim 1, wherein the interlayer film contains a pigment in a region corresponding to the first region.

6. The laminated glass according to claim 1, wherein the interlayer film contains a heat shielding substance in a region corresponding to the first region.

7. The laminated glass according to claim 1, wherein the interlayer film contains a cyclic cyanine compound, inorganic oxide particles, or carbon black in a region corresponding to the first region.

8. The laminated glass according to claim 7, wherein the inorganic oxide particles include cesium-doped tungsten oxide particles, or tin-doped indium oxide particles.

9. The laminated glass according to claim 1, wherein light transmittance of the second lamination glass member is 85% or more at every wavelength within a range of 380 nm to 2500 nm.

10. The laminated glass according to claim 1, wherein at least one of the first lamination glass member and the second lamination glass member is extra clear glass.

11. The laminated glass according to claim 1, wherein the interlayer film contains a heat reflective film in a region corresponding to the first region.

12. A vehicle comprising:
a vehicle body;
a laminated glass; and
a remote sensing device capable of applying light,
the remote sensing device being arranged at such a position that light applied from the remote sensing device can penetrate the second region of the laminated glass,
the laminated glass comprising a first lamination glass member, a second lamination glass member, and an interlayer film,
the interlayer film being arranged between the first lamination glass member and the second lamination glass member,
the first lamination glass member having a light transmittance of 85% or more at every wavelength within a range of 380 nm to 2500 nm,
the laminated glass having a first region and a second region, and
the second region having a light transmittance of higher than a light transmittance of the first region by 5% or more at at least one wavelength within a range of 380 nm to 2500 nm.

13. The vehicle according to claim 12, wherein
the remote sensing device is a remote sensing device capable of applying an infrared ray, and
the remote sensing device is arranged at such a position that the infrared ray applied from the remote sensing device can penetrate the second region of the laminated glass.

14. The vehicle according to claim 12, wherein the remote sensing device is a LiDAR that enables 3D mapping of a peripheral environment of the vehicle, and is a scanning LiDAR, a rotating LiDAR, a flash LiDAR or a solid state LiDAR.

15. The vehicle according to claim 12, wherein light transmittance of the second region is higher than light transmittance of the first region by 5% or more at at least one wavelength within a range of 780 nm to 1000 nm.

16. The vehicle according to claim 12, wherein light transmittance of the second region is 90% or more at at least one wavelength within a range of 780 nm to 1000 nm.

17. The vehicle according to claim 12, wherein a region of 0 cm to 30 cm from at least one end part of the laminated glass to an inner side of the laminated glass has the second region.

18. The vehicle according to claim 12, wherein the interlayer film contains a cyclic cyanine compound, inorganic oxide particles, or carbon black in a region corresponding to the first region.

19. The vehicle according to claim 18, wherein the inorganic oxide particles include cesium-doped tungsten oxide particles, or tin-doped indium oxide particles.

20. The vehicle according to claim 12, wherein at least one of the first lamination glass member and the second lamination glass member is extra clear glass.

* * * * *